(12) United States Patent
Zhou et al.

(10) Patent No.: US 11,459,253 B2
(45) Date of Patent: Oct. 4, 2022

(54) METHODS OF RECOVERING PLATINUM GROUP METALS FROM WASTE STREAMS

(71) Applicant: ARIZONA BOARD OF REGENTS ON BEHALF OF ARIZONA STATE UNIVERSITY, Scottsdale, AZ (US)

(72) Inventors: Chen Zhou, Tempe, AZ (US); Andrew Marcus, Tempe, AZ (US); Bruce Rittmann, Tempe, AZ (US); Zhaocheng Wang, Tempe, AZ (US); Aura Ontiveros-Valencia, Tempe, AZ (US); Rosa Krajmalnik-Brown, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 1098 days.

(21) Appl. No.: 16/074,719

(22) PCT Filed: Feb. 2, 2017

(86) PCT No.: PCT/US2017/016179
§ 371 (c)(1),
(2) Date: Aug. 1, 2018

(87) PCT Pub. No.: WO2017/136528
PCT Pub. Date: Aug. 10, 2017

(65) Prior Publication Data
US 2021/0179463 A1    Jun. 17, 2021

Related U.S. Application Data

(60) Provisional application No. 62/290,902, filed on Feb. 3, 2016.

(51) Int. Cl.
*C02F 3/28*      (2006.01)
*C02F 3/34*      (2006.01)
(Continued)

(52) U.S. Cl.
CPC .......... *C02F 3/2806* (2013.01); *C02F 3/2853* (2013.01); *C02F 3/341* (2013.01);
(Continued)

(58) Field of Classification Search
CPC ...... C02F 3/2806; C02F 3/2853; C02F 3/341; C02F 2101/20; C02F 2103/10;
(Continued)

(56) References Cited

U.S. PATENT DOCUMENTS

| 6,387,262 B1 | 5/2002 | Rittmann et al. |
| 7,186,340 B1 | 3/2007 | Rittman et al. |

(Continued)

FOREIGN PATENT DOCUMENTS

| WO | 2006/087334 A1 | 8/2006 |
| WO | 2009023578 A1 | 2/2009 |

(Continued)

OTHER PUBLICATIONS

Al Bahri, M. et al., "Activated carbon supported metal catalysts for reduction of nitrate in water with high selectivity towards N2", Applied Catalysis B: Environmental, Jul. 2013 (available online Mar. 2013), vol. 138-139, pp. 141-148 <DOI:10.1016/j.apcatb.2013.02.048>.

(Continued)

*Primary Examiner* — Fred Prince
(74) *Attorney, Agent, or Firm* — Rodney J. Fuller; Booth Udall Fuller, PLC

(57) ABSTRACT

The present invention relates to systems and methods for removing and recovering precious metals, such as platinum-group metals (PGMs), including palladium, from wastewater and waste streams. The invention also relates to systems and methods for recycling the recovered precious metals for catalytic applications.

20 Claims, 10 Drawing Sheets

(51) Int. Cl.
   *C02F 101/20* (2006.01)
   *C02F 103/10* (2006.01)
(52) U.S. Cl.
   CPC ...... *C02F 2101/20* (2013.01); *C02F 2103/10* (2013.01); *C02F 2209/15* (2013.01); *C02F 2209/30* (2013.01); *C02F 2209/38* (2013.01); *C02F 2209/40* (2013.01); *C02F 2305/02* (2013.01)
(58) Field of Classification Search
   CPC .............. C02F 2209/15; C02F 2209/30; C02F 2209/38; C02F 2209/40; C02F 2305/02; Y02E 50/30
   USPC ................. 210/615, 610, 611, 911, 912, 903
   See application file for complete search history.

(56) References Cited

U.S. PATENT DOCUMENTS

| | | | |
|---|---|---|---|
| 7,279,103 | B2 | 10/2007 | Burckle et al. |
| 7,338,597 | B1 | 3/2008 | Rittmann et al. |
| 7,491,331 | B2 | 2/2009 | Rittmann et al. |
| 7,632,415 | B1 | 12/2009 | Rittmann et al. |
| 7,910,009 | B1 | 3/2011 | Rittmann et al. |
| 7,931,807 | B2 | 4/2011 | Bowman |
| 8,173,020 | B2 | 5/2012 | Bowman |
| 8,388,844 | B2 | 3/2013 | Marsolek et al. |
| 8,888,891 | B2* | 11/2014 | Sakakibara ............... C02F 3/32 75/711 |
| 9,216,919 | B2 | 12/2015 | Popat et al. |
| 2011/0275117 | A1 | 11/2011 | Rittman et al. |
| 2012/0238002 | A1 | 9/2012 | Rittman et al. |
| 2013/0115684 | A1 | 5/2013 | Rittman et al. |
| 2013/0295649 | A1 | 11/2013 | Rittmann et al. |
| 2013/0345990 | A1 | 12/2013 | Ziv-El et al. |
| 2015/0166380 | A1 | 6/2015 | Husain et al. |
| 2015/0251934 | A1* | 9/2015 | Bretschger ............... C02F 3/301 429/2 |
| 2017/0015968 | A1 | 1/2017 | Parameswaran et al. |
| 2018/0105780 | A1 | 4/2018 | Rittman et al. |

FOREIGN PATENT DOCUMENTS

| | | |
|---|---|---|
| WO | 2009111256 A2 | 9/2009 |
| WO | 2010042484 A2 | 4/2010 |
| WO | 2011112540 A2 | 9/2011 |
| WO | 2015138627 A1 | 9/2015 |
| WO | 2016164563 A1 | 10/2016 |
| WO | 2017136528 A1 | 8/2017 |

OTHER PUBLICATIONS

Akhtar, M. et al., "Biogenic Synthesis of Metallic Nanoparticles by Plant Extracts", ACS Sustainable Chemistry & Engineering, Jun. 2013 (available online Apr. 2013), vol. 1, No. 6, pp. 591-602 <DOI:10.1021/sc300118u>.

Akob, D. et al., "Functional Diversity and Electron Donor Dependence of Microbial Populations Capable of U(VI) Reduction in Radionuclide-Contaminated Subsurface Sediments", Applied and Environmental Microbiology, May 2008, vol. 74, No. 10, pp. 3159-3170 <DOI:10.1128/AEM.02881-07>.

Alinsafi, A. et al., "Nitrite effect on nitrous oxide emission from denitrifying activated sludge", Process Biochemistry, Jun. 2008 (available online Feb. 2008), vol. 43, No. 6, pp. 683-689 <DOI:10.1016/j.procbio.2008.02.008>.

Badireddy, A. et al., "Detection, Characterization, and Abundance of Engineered Nanoparticles in Complex Waters by Hyperspectral Imagery with Enhanced Darkfield Microscopy", Environmental Science & Technology, Sep. 2012, vol. 46, No. 18, pp. 10081-10088 <DOI:10.1021/es204140s>.

Barrabés, N. et al., "Catalytic nitrate removal from water, past, present and future perspectives", Applied Catalysis B: Environmental, Apr. 2011 (available online Mar. 2011), vol. 104, No. 1-2, pp. 1-5 <DOI: 10.1016/j.apcatb.2011.03.011>.

Basnet, M. et al., "Interaction between palladium-doped zerovalent iron nanoparticles and biofilm in granular porous media: characterization, transport and viability", Environmental Science: Nano, 2016 (available online Nov. 2015), vol. 3, No. 1, pp. 127-137 <DOI:10.1039/C5EN00109A>.

Bastús, N. et al., "Kinetically Controlled Seeded Growth Synthesis of Citrate-Stabilized Gold Nanoparticles of up to 200 nm: Size Focusing versus Ostwald Ripening", Langmuir, Sep. 2011 (available online Jul. 2011), vol. 27, No. 17, pp. 11098-11105 <DOI:10.1021/la201938u>.

Bearson, S. et al., "Acid stress responses in enterobacteria", FEMS Microbiology Letters, Feb. 1997, vol. 147, No. 2, pp. 173-180 <DOI:10.1111/j.1574-6968.1997.tb10238.x>.

Bennett, J. et al., "Nanoparticles of palladium supported on bacterial biomass: New re-usable heterogeneous catalyst with comparable activity to homogeneous colloidal Pd in the Heck reaction" Applied Catalysis B: Environmental, Aug.-Sep. 2013 (available online Apr. 2013, vol. 140-141, pp. 700-707 <DOI:10.1016/j.apcatb.2013.04.022>.

Besson, C. et al., "A Mechanism for Transition-Metal Nanoparticle Self-Assembly", Journal of the American Chemical Society, Jun. 2005 (available online May 2005), vol. 127, No. 22, pp. 8179-8184 <DOI:10.1021/ja0504439>.

Besson, C. et al., "Nanocluster Nucleation, Growth, and Then Agglomeration Kinetic and Mechanistic Studies: A More General, Four-Step Mechanism Involving Double Autocatalysis", Chemistry of Materials, Oct. 2005 (available online Aug. 2005), vol. 17, No. 20, pp. 4925-4938 <DOI:10.1021/cm050207x>.

Bunge, M. et al., "Formation of palladium(0) nanoparticles at microbial surfaces", Biotechnology & Bioengineering, Oct. 2010 (available online Aug. 2010), vol. 107, No. 2, pp. 206-215 <DOI:10.1002/bit.22801>.

Burch, R. et al., "An investigation of the NO/H2/O2 reaction on noble-metal catalysts at low temperatures under lean-burn conditions", Applied Catalysis B: Environmental, Nov. 1999 (available online Oct. 1999), vol. 23, No. 2-3, pp. 115-121 <DOI:10.1016/S0926-3373(99)00073-9>.

Camargo, J. et al., "Ecological and toxicological effects of inorganic nitrogen pollution in aquatic ecosystems: A global assessment", Environmental International, Aug. 2006 (available online Jun. 2006), vol. 32, No. 6, pp. 831-849 <DOI:10.1016/j.envint.2006.05.002>.

Capeness, M. et al., "Nickel and platinum group metal nanoparticle production by Desulfovibrio alaskensis G20", New Biotechnology, Dec. 2015 (available online Feb. 2015), vol. 32, No. 6, pp. 727-731 <DOI:10.1016/j.nbt.2015.02.002>.

Caporaso, J. et al., "QIIME allows analysis of high-throughput community sequencing data", Nature Methods, Apr. 2010, vol. 7, pp. 335-336 <DOI:10.1038/nmeth.f.303>.

Caporaso, J. et al., "Ultra-high-throughput microbial community analysis on the Illumina HiSeq and MiSeq platforms", The ISME Journal, Mar. 2012, vol. 6, pp. 1621-1624 <DOI:10.1038/ismej.2012.8>.

Centi, G. et al., "Tubular Inorganic catalytic membrane reactors: advantages and performance in multiphase hydrogenation reactions", Catalysis Today, Apr. 2003, vol. 79-80, pp. 139-149 <DOI:10.1016/S0920-5861(03)00019-1>.

Chaplin, B. et al., "Effects of Natural Water Ions and Humic Acid on Catalytic Nitrate Reduction Kinetics Using an Alumina Supported Pd-Cu Catalyst", Environmental Science & Technology, May 2006 (available online Mar. 2006), vol. 40, No. 9, pp. 3075-3081 <DOI:10.1021/es0525298>.

Chaplin, B. et al., "Regeneration of Sulfur-Fouled Bimetallic Pd-Based Catalysts", Environmental Science & Technology, Aug. 2007 (available online Jun. 2007), vol. 41, No. 15, pp. 5491-5497 <DOI:10.1021/es0704333>.

Chinthaginjala, J. et al., "Support effect on selectivity of nitrite reduction in water", Applied Catalysis B: Environmental, Nov. 2010 (available online Oct. 2010), vol. 101, No. 1-2, pp. 144-149 <DOI:10.1016/j.apcatb.2010.09.023>.

(56) References Cited

OTHER PUBLICATIONS

Choi, E-K. et al., "Formic acid as an alternative reducing agent for the catalytic nitrate reduction in aqueous media", Journal of Environmental Sciences, Aug. 2013, vol. 25, No. 8, pp. 1696-1702 <DOI:10.1016/S1001-0742(12)60226-5>.

Chung, J. et al., "Bioreduction of Selenate Using a Hydrogen-Based Membrane Biofilm Reactor", Environmental Science & Technology, Mar. 2006 (available online Feb. 2006), vol. 40, No. 5, pp. 1664-1671 <DOI:10.1021/es051251g>.

Chung, J. et al., "Evaluation for Biological Reduction of Nitrate and Perchlorate in Brine Water Using the Hydrogen-Based Membrane Biofilm Reactor", Journal of Environmental Engineering, Feb. 2007, vol. 133, No. 2, pp. 157-164 <DOI:10.1061/ASCE0733-9372 2007133:2 157>.

Coker, V. et al., "Microbial Engineering of Nanoheterostructures: Biological Synthesis of a Magnetically Recoverable Palladium Nanocatalyst", ACS Nano, May 2010 (available online Apr. 2010), vol. 4, No. 5, pp. 2577-2584 <DOI:10.1021/nn9017944>.

Constantinou, C. et al., "The Remarkable Effect of Oxygen on the N2 Selectivity of Water Catalytic Denitrification by Hydrogen", Environmental Science & Technology, Feb. 2007 (available online Dec. 2006), vol. 41, No. 3, pp. 950-956 <DOI:10.1021/es061392y>.

Costerton, J. et al., "Bacterial Biofilms: A Common Cause of Persistent Infections", Science, May 1999, vol. 284, No. 5418, pp. 1318-1322 <DOI:10.1126/science.284.5418.1318>.

De Vargas, I. et al., "Biosorption of palladium and platinum by sulfate-reducing bacteria", Chemical Technology and Biotechnology, Jan. 2004 (available online Dec. 2003), vol. 79, No. 1, pp. 49-56 <DOI:10.1002/jctb.928>.

De Windt, W. et al., "Biological control of the size and reactivity of catalytic Pd(0) produced by Shewanella oneidensis", Antonie van Leeuwenhoek, Nov. 2006 (available online Oct. 2006), vol. 90, No. 4, pp. 377-389 <DOI:10.1007/s10482-006-9088-4>.

De Windt, W. et al., "Bioreductive deposition of palladium (0) nanoparticles on Shewanella oneidensis with catalytic activity towards reductive dechlorination of polychlorinated biphenyls", Environmental Microbiology, Mar. 2005 (available online Jan. 2005), vol. 7, No. 3, pp. 314-325 <DOI:10.1111/j.1462-2920.2005.00696.x>.

Della Torre, C. et al., "Interaction of ABC transport proteins with toxic metals at the level of gene and transport activity in the PLHC-1 fish cell line", Chemico-Biological Interactions, Jun. 2012 (available online May 2012), vol. 198, No. 1-3, pp. 9-17 <DOI:10.1016/j.cbi.2012.04.008>.

Demopoulos, G., "Refining of Platinum-Group Materials", Canadian Mining and Metallurgical Bulletin, 1989, vol. 82, No. 923, pp. 165-171.

Deplanche, K. et al., "Catalytic activity of biomass-supported Pd nanoparticles: Influence of the biological component in catalytic efficacy and potential application in 'green' synthesis of fine chemicals and pharmaceuticals", Applied Catalysis B: Environmental, Apr. 2014 (available online Oct. 2013), vol. 147, pp. 651-665 <DOI:10.1016/j.apcatb.2013.09.045>.

Deplanche, K. et al., "Involvement of hydrogenases in the formation of highly catalytic Pd(0) nanoparticles by bioreduction of Pd(II) using Escherichia coli mutant strains", Microbiology, Sep. 2010, vol. 156, pp. 2630-2640 <DOI:10.1099/mic.0.036681-0>.

Doudrick, K. et al., "Photocatalytic nitrate reduction in water: Managing the hole scavenger and reaction by-product selectivity", Applied Catalysis B: Environmental, Jun. 2013 (available online Feb. 2013), vol. 136-137, pp. 40-47 <DOI:10.1016/j.apcatb.2013.01.042>.

Earth Microbiome Project., "EMP Standard Protocols" [online], Earth Microbiome Project, 2011 [retrieved Aug. 8, 2019 from archive.org, as it appeared on Aug. 21, 2011], retrieved from the internet: <URL:https://web.archive.org/web/20110821072330/http://www.earthmicrobiome.org/emp-standard-protocols/>.

Evans, P. et al., "Perchlorate Destruction and Potable Water Production Using Membrane Biofilm Reduction and Membrane Filtration", ESTCP Project ER-200541, Sep. 2013, 74 pages.

Fahmy, K. et al., "Secondary Structure and Pd(II) Coordination in S-Layer Proteins from Bacillus sphaericus Studied by Infrared and X-Ray Absorption Spectroscopy", Biophysical Journal, Aug. 2006 (available online Jan. 2009), vol. 91, No. 3, pp. 996-1007 <DOI:10.1529/biophysj.105.079137>.

Foulkes, J. et al., "Engineering a Biometallic Whole Cell Catalyst for Enantioselective Deracemization Reactions", ACS Catalysis, Nov. 2011 (available online Oct. 2011), vol. 1, No. 11, pp. 1589-1594 <DOI:10.1021/cs200400t>.

Frank, B. et al., "Kinetics and mechanism of the reduction of nitric oxides by H2 under lean-burn conditions on a Pt-Mo-Co/α-Al2O3 catalyst", Applied Catalysis B: Environmental, Oct. 1998 (available online Nov. 1998), vol. 19, No. 1, pp. 45-57 <DOI:10.1016/S0926-3373(98)00057-5>.

Gauthier, D. et al., "Environmentally Benign Recovery and Reactivation of Palladium from Industrial Waste by Using Gram-Negative Bacteria", ChemSusChem, Sep. 2010 (available online Jul. 2010), vol. 3, No. 9, pp. 1036-1039 <DOI:10.1002/cssc.201000091>.

Gonzáles-Toril, E. et al., "Pyrosequencing-Based Assessment of the Microbial Community Structure of Pastoruri Glacier Area (Huascarán National Park, Perú), a Natural Extreme Acidic Environment", Microbial Ecology, Nov. 2015 (available online Jun. 2015), vol. 70, No. 4, pp. 936-947 <DOI:10.1007/s00248-015-0634-3>.

Guibal, E., "Interactions of metal ions with chitosan-based sorbents: a review", Separation and Purification Technology, Jul. 2004 (available online Dec. 2003), vol. 38, No. 1, pp. 43-74 <DOI:10.1016/j.seppur.2003.10.004>.

Hemme, C. et al., "Metagenomic insights into evolution of a heavy metal-contaminated groundwater microbial community", The ISME Journal, Feb. 2010, vol. 4, pp. 660-672 <DOI:10.1038/ismej.2009.154>.

Hennebel, T. et al., "Biogenic metals in advanced water treatment", Trends in Biotechnology, Feb. 2009 (available online Dec. 2008), vol. 27, No. 2, pp. 90-98 <DOI:10.1016/j.tibtech.2008.11.002>.

Hennebel, T. et al., "Palladium nanoparticles produced by fermentatively cultivated bacteria as catalyst for diatrizoate removal with biogenic hydrogen", Applied Microbiology and Biotechnology, Sep. 2011 (available online May 2011), vol. 91, No. 5, pp. 1435-1445 <DOI:10.1007/s00253-011-3329-9>.

Hérissan, A. et al., "Reduction of nitrate by heterogeneous photocatalysis over pure and radiolytically modified TiO2 samples in the presence of formic acid", Catalysis Today, Mar. 2017 (available online Jul. 2016), vol. 281, No. 1, pp. 101-108 <DOI:10.1016/j.cattod.2016.05.044>.

Hoque, E. et al., "Biotechnological recovery of heavy metals from secondary sources—An overview", Materials Science and Engineering: C, Mar. 2011 (available online Oct. 2010), vol. 31, No. 2, pp. 57-66 <DOI:10.1016/j.msec.2010.09.019>.

Hörold, S. et al., "Development of catalysts for a selective nitrate and nitrite removal from drinking water", Catalysis Today, May 1993 (available online Jul. 2001), vol. 17, No. 1-2, pp. 21-30 <DOI:10.1016/0920-5861(93)80004-K>.

Hosseinkhani, B. et al., "Biogenic Nanopalladium Based Remediation of Chlorinated Hydrocarbons in Marine Environments", Environmental Science & Technology, Jan. 2014 (available online Dec. 2013), vol. 48, No. 1, pp. 550-557 <DOI:10.1021/es403047u>.

Iravani, S., "Green synthesis of metal nanoparticles using plants", Green Chemistry, Aug. 2011, vol. 13, No. 10, pp. 2638-2650 <DOI:10.1039/C1GC15386B>.

Kainz, Q. et al., "Palladium Nanoparticles Supported on Magnetic Carbon-Coated Cobalt Nanobeads: Highly Active and Recyclable Catalysts for Alkene Hydrogenation", Advanced Functional Materials, Apr. 2014 (available online Nov. 2013), vol. 24, No. 14, pp. 2020-2027 <DOI:10.1002/adfm.201303277>.

Karnachuk, O. et al., "Draft genome sequence of the first acid-tolerant sulfate-reducing deltaproteobacterium Desulfovibrio sp. TomC having potential for minewater treatment", FEMS Microbiology Letters, Feb. 2015, vol. 362, No. 4, pp. 1-3 <DOI:10.1093/femsle/fnv007>.

(56) References Cited

OTHER PUBLICATIONS

Kay, C. et al., "Evolution of Microbial "Streamer" Growths in an Acidic, Metal-Contaminated Stream Draining an Abandoned Underground Copper Mine", Life, Feb. 2013, vol. 3, No. 1, pp. 189-210 <DOI:10.3390/life3010189>.

Khan, M. et al., "Biogenic synthesis of palladium nanoparticles using Pulicaria glutinosa extract and their catalytic activity towards the Suzuki coupling reaction", Dalton Transactions, Feb. 2014, vol. 43, No. 24, pp. 9026-9031 <DOI:10.1039/C3DT53554A>.

Kimura, S. et al., "Biodiversity and geochemistry of an extremely acidic, low-temperature subterranean environment sustained by chemolithotrophy", Environmental Microbiology, Aug. 2011 (available online Mar. 2011), vol. 13, No. 8, pp. 2092-2104 <DOI:10.1111/j.1462-2920.2011.02434.x>.

Kora, A. et al., "Green synthesis of palladium nanoparticles using gum ghatti (*Anogeissus latifolia*) and its application as an antioxidant and catalyst", Arabian Journal of Chemistry, Nov. 2018 (available online Jun. 2015), vol. 11, No. 7, pp. 1097-1106 <DOI:10.1016/j.arabjc.2015.06.024>.

Langille, M. et al., "Predictive functional profiling of microbial communities using 16S rRNA marker gene sequences", Nature Biotechnology, Aug. 2013, vol. 31, pp. 814-821 <DOI:10.1038/nbt.2676>.

Laspidou, C. et al., "A unified theory for extracellular polymeric substances, soluble microbial products, and active and inert biomass", Water Research, Jun. 2002 (available online Mar. 2002), vol. 36, No. 11, pp. 2711-2720 <DOI:10.1016/S0043-1354(01)00413-4>.

Leal, B. et al., "Palladium metal nanoparticles stabilized by ionophilic ligands in ionic liquids: synthesis and application n hydrogenation reactions", Catalysis Science & Technology, 2015 (available online Sep. 2014), vol. 5, No. 2, pp. 903-909 <DOI:10.1039/C4CY01116C>.

Lee, K-C. et al., "A novel hollow-fibre membrane biofilm reactor for autohydrogenotrophic denitrification of drinking water", Water Science & Technology, Feb. 2000, vol. 41, No. 4-5, pp. 219-226 <DOI:10.2166/wst.2000.0448>.

Lee, K-C. et al., "Applying a novel autohydrogenotrophic hollow-fiber membrane biofilm reactor for denitrification of drinking water", Water Research, Apr. 2002 (available online Nov. 2001), vol. 36, No. 8, pp. 2040-2052 <DOI:10.1016/S0043-1354(01)00425-0>.

Lengke, M. et al., "Synthesis of Palladium Nanoparticles by Reaction of Filamentous Cyanobacterial Biomass with a Palladium(II) Chloride Complex", Langmuir, Aug. 2007 (available online Jul. 2007), vol. 23, No. 17, pp. 8982-8987 <DOI:10.1021/la7012446>.

Levi, N. et al., "Diastereoselective and Enantiospecific Direct Reductive Amination in Water Catalyzed by Palladium Nanoparticles Stabilized by Polyethyleneimine Derivatives", ACS Catalysis, Sep. 2013 (available online Jul. 2013), vol. 3, No. 9, pp. 1915-1918 <DOI:10.1021/cs4005453>.

Li, P. et al., "Nitrogen Removal and N2O Accumulation during Hydrogenotrophic Denitrification: Influence of Environmental Factors and Microbial Community Characteristics", Environmental Science & Technology, 2017 [available online Aug. 2016], vol. 51, No. 2, pp. 870-879 <DOI:10.1021/acs.est.6b00071>.

Li, W. et al., "Effect of self-alkalization on nitrite accumulation in a high-rate denitrification system: Performance, microflora and enzymatic activities", Water Research, Jan. 2016 (available online Nov. 2015), vol. 88, pp. 758-765 <DOI:10.1016/j.watres.2015.11.003>.

Liu, Y. et al., "Highly dispersive supported palladium catalyst prepared by microbial reduction", CJI, Mar. 2000, vol. 2, No. 3, pp. 13 <URL:http://www.mdpi.org/cji/cji/2000/023013pe.htm>.

Lloyd, J. et al., "Enzymatic Recovery of Elemental Palladium by Using Sulfate-Reducing Bacteria", Applied and Environmental Microbiology, Nov. 1998, vol. 64, No. 11, pp. 4607-4609.

Ludwig, W. et al., "Subsurface Hydrogen Diffusion into Pd Nanoparticles: Role of Low-Coordinated Surface Sites and Facilitation by Carbon", The Journal of Physical Chemistry C, Feb. 2012 (available online Jan. 2012), vol. 116, No. 5, pp. 3539-3544 <DOI:10.1021/jp209033s>.

Macaskie, L. et al., "Use of Desulfovibrio and *Escherichia coli* Pd-nanocatalysts in reduction of Cr(VI) and hydrogenolytic dehalogenation of polychlorinated biphenyls and used transformer oil", Chemical Technology and Biotechnology, Oct. 2012 (available online Mar. 2012), vol. 87, No. 10, pp. 1430-1435 <DOI:10.1002/jctb.3763>.

Marchesini, F. et al., "Spectroscopic and catalytic characterization of Pd-In and Pt-In supported on Al2O3 and SiO2, active catalysts for nitrate hydrogenation", Applied Catalysis A: General, Sep. 2008 (available online Jun. 2008), vol. 348, No. 1, pp. 60-70 <DOI:10.1016/j.apcata.2008.06.026>.

Martin, K. et al., "Assessing microbial competition in a hydrogen-based membrane biofilm reactor (MBfR) using multidimensional modeling", Biotechnology and Bioengineering, Sep. 2015 (available online Apr. 2015), vol. 112, No. 9, pp. 1843-1853 <DOI:10.1002/bit.25607>.

Martin, K. et al., "Multidimensional modeling of biofilm development and fluid dynamics in a hydrogen-based, membrane biofilm reactor (MBfR)", Water Research, Sep. 2013 (available online May 2013), vol. 47, No. 13, pp. 4739-4751 <DOI:10.1016/j.watres.2013.04.031>.

Martin, K. et al., "The membrane biofilm reactor (MBfR) for water and wastewater treatment: Principles, applications, and recent developments", Bioresource Technology, Oct. 2012 (available online Mar. 2012), vol. 122, pp. 83-94 <DOI:10.1016/j.biortech.2012.02.110>.

Matatov-Meytal, Y. et al., "Cloth catalysts in water denitrification: I. Pd on glass fibers", Applied Catalysis B: Environmental, Jul. 2000 (available online May 2000), vol. 27, No. 2, pp. 127-135 <DOI:10.1016/S0926-3373(00)00141-7>.

Matějů, V. et al., "Biological water denitrification—A review", Enzyme and Microbial Technology, Mar. 1992 (available online Dec. 2002), vol. 14, No. 3, pp. 170-183 <DOI:10.1016/0141-0229(92)90062-S>.

McGlone, M., "Precious Metals, Gold, and Emerging Markets", Journal of Investing, Spring 2015, vol. 24, No. 1, pp. 124-131 <DOI: 10.3905/joi.2015.24.1.124>.

Mikheenko, I. et al., "Bioaccumulation of Palladium by Desulfovibrio fructosivorans Wild-Type and Hydrogenase-Deficient Strains", Applied and Environmental Microbiology, Oct. 2008, vol. 74, No. 19, pp. 6144-6146 <DOI:10.1128/AEM.02538-07>.

Moerz, S. et al., "Formation Mechanism for Stable Hybrid Clusters of Proteins and Nanoparticles", ACS Nano, Jul. 2015 (available online Jun. 2015), vol. 9, No. 7, pp. 6696-6705 <DOI:10.1021/acsnano.5b01043>.

Moreau, J. et al., "Extracellular Proteins Limit the Dispersal of Biogenic Nanoparticles", Science, Jun. 2007, vol. 316, No. 5831, pp. 1600-1603 <DOI:10.1126/science.1141064>.

Nerenberg, R. et al., "Perchlorate reduction in a Hydrogen-Based Membrane-Biofilm Reactor", Journal of the American Water Works Association, Nov. 2002, vol. 94, No. 11, pp. 103-114 <DOI:10.1002/i.1551-8833.2002.tb10234.x>.

Nerenberg, R., "The membrane-biofilm reactor (MBfR) as a counter-diffusional biofilm process", Current Opinion in Biotechnology, Apr. 2016 (available online Feb. 2016), vol. 38, pp. 131-136 <DOI:10.1016/j.copbio.2016.01.015>.

Nichols, G. et al., "A Review of the Terms Agglomerate and Aggregate with a Recommendation for Nomenclature Used in Powder and Particle Characterization", Journal of Pharmaceutical Sciences, Oct. 2002 (available online Jul. 2002), vol. 91, No. 10, pp. 2103-2109 <DOI:10.1002/jps.10191>.

Omajali, J. et al., "Characterization of intracellular palladium nanoparticles synthesized by Desulfovibrio desulfuricans and Bacillus benzeovorans", Journal of Nanoparticle Research, Jun. 2015, vol. 17, article 264, 17 pages <DOI:10.1007/s11051-015-3067-5>.

Ontiveros-Valencia, A. et al., "Interactions between Nitrate-Reducing and Sulfate-Reducing Bacteria Coexisting in a Hydrogen-Fed Biofilm", Environmental Science & Technology, Oct. 2012, vol. 46, No. 20, pp. 11289-11298 <DOI:10.1021/es302370t>.

Ontiveros-Valencia, A. et al., "Managing the interactions between sulfate- and perchlorate-reducing bacteria when using hydrogen-fed

(56) References Cited

OTHER PUBLICATIONS biofilms to treat a groundwater with a high perchlorate concentration", Water Research, May 2014 (available online Feb. 2014), vol. 55, pp. 215-224 <DOI:10.1016/j.watres.2014.02.020>.
Ontiveros-Valencia, A. et al., "Phylogenetic analysis of nitrate- and sulfate-reducing bacteria in a hydrogen-fed biofilm", FEMS Microbiology Ecology, Jul. 2013, vol. 85, No. 1, pp. 158-167 <DOI:10 1111/1574-6941.12107>.
Ontiveros-Valencia, A. et al., "Pyrosequencing Analysis Yields Comprehensive Assessment of Microbial Communities in Pilot-Scale Two-Stage Membrane Biofilm Reactors", Envrionmental Science & Technology, Jul. 2014 (available online Jun. 2014), vol. 48, No. 13, pp. 7511-7518 <DOI:10.1021/es5012466>.
Patent Cooperation Treaty, International Searching Authority, International Preliminary Report on Patentability for PCT/US2017/016179, 6 pages, report dated Aug. 7, 2018, opinion dated Apr. 7, 2017.
Patent Cooperation Treaty, International Searching Authority, International Search Report for PCT/US2017/016179, 3 pages, dated Apr. 7, 2017.
Pat-Espadas, A. et al., "Continuous removal and recovery of palladium in an upflow anaerobic granular sludge bed (UASB) reactor", Chemical Technology and Biotechnology, Apr. 2016 (available online Apr. 2015), vol. 91, No. 4, pp. 1183-1189 <DOI: 10.1002/jctb.4708>.
Pat-Espadas, A. et al., "Direct and Quinone-Mediated Palladium Reduction by Geobacter sulfurreducens: Mechanisms and Modeling", Environmental Sciecne & Technology, Mar. 2014 (available online Feb. 2014), vol. 48, No. 5, pp. 2910-2919 <DOI:10.1021/es403968e>.
Prüsse, U. et al., "Improving the catalytic nitrate reduction", Catalysis Today, Jan. 2000 (available online Mar. 2000), vol. 55, No. 1-2, pp. 79-90 <DOI:10.1016/S0920-5861(99)00228-X>.
Prüsse, U. et al., "Supported bimetallic palladium catalysts for water-phase nitrate reduction", Journal of Molecular Catalysis A: Chemical, Sep. 2001 (available online Jul. 2001), vol. 173, No. 1-2, pp. 313-328 <DOI:10.1016/S1381-1169(01)00156-X>.
Raut, R. et al., "Rapid biosynthesis of platinum and palladium metal nanoparticles using root extract of Asparagus racemosus Linn", Advanced Materials Letters, Jan. 2013, vol. 4, No. 8, pp. 650-654 <DOI:10.5185/amlett.2012.11470>.
Reinhard, B., "Use and Demand of Palladium for the Industry", Palladium Emissions in the Environment, 2006, pp. 39-51 <DOI: 10.1007/3-540-29220-9_3>.
Rittmann, B. et al., "Hydrogen-based hollow-fiber membrane biofilm reactor (MBfR) for removing oxidized contaminants", Water Supply, Feb. 2004, vol. 4, No. 1, pp. 127-133 <DOI:10.2166/ws.2004.0015>.
Rittmann, B., "The membrane biofilm reactor: the natural partnership of membranes and biofilm", Water Science & Technology, Feb. 2006, vol. 53, No. 3, pp. 219-225 <DOI:10.2166/wst.2006.096>.
Rivett, M. et al., "Nitrate attenuation in groundwater: A review of biogeochemical controlling processes", Water Research, Oct. 2008 (available online Jul. 2008), vol. 42, No. 16, pp. 4215-4232 <DOI:10.1016/j.watres.2008.07.020>.
Rotaru, A-E. et al., "Non-enzymatic palladium recovery on microbial and synthetic surfaces", Biotechnology & Bioengineering, Aug. 2012 (available online Mar. 2012), vol. 109, No. 8, pp. 1889-1897 <DOI:10.1002/bit.24500>.
Rowe, O. et al., "Microbial communities and geochemical dynamics in an extremely acidic, metal-rich stream at an abandoned sulfide mine (Huelva, Spain) underpinned by two functional primary production systems", Environmental Microbiology, Jul. 2007 (available online May 2007), vol. 9, No. 7, pp. 1761-1771 <DOI:10.1111/i.1462-2920.2007.01294.x>.
Sánchez-Andrea, I. et al., "Microbial Diversity in Anaerobic Sediments at Río Tinto, a Naturally Acidic Environment with a High Heavy Metal Content", Applied and Environmental Microbiology, Sep. 2011, vol. 77, No. 17, pp. 6085-6093 <DOI:10.1128/AEM.00654-11>.

Shuai, D. et al., "Enhanced Activity and Selectivity of Carbon Nanofiber Supported Pd Catalysts for Nitrite Reduction", Environmental Science & Technology, Mar. 2012 (available online Feb. 2012), vol. 46, No. 5, pp. 2847-2855 <DOI:10.1021/es203200d>.
Shuai, D. et al., "Structure Sensitivity Study of Waterborne Contaminant Hydrogenation Using Shape- and Size-Controlled Pd Nanoparticles", ACS Catalysis, Mar. 2013 (available online Feb. 2013), vol. 3, No. 3, pp. 453-463 <DOI:10.1021/cs300616d>.
Soares, O. et al., "Kinetic Modeling of Nitrate Reduction Catalyzed by Pd-Cu Supported on Carbon Nanotubes", Industrial & Engineering Chemistry Research, Apr. 2012 (available online Mar. 2012), vol. 51, No. 13, pp. 4854-4860 <DOI:10.1021/ie202957v>.
Soares, O. et al., "Pd-Cu and Pt-Cu Catalysts Supported on Carbon Nanotubes for Nitrate Reduction in Water", Industrial & Engineering Chemistry Research, Jul. 2010, vol. 49, No. 16, pp. 7183-7192 <DOI:10.1021/ie1001907>.
Søbjerg, L. et al., "Bio-supported palladium nanoparticles as a catalyst for Suzuki-Miyaura and Mizoroki-Heck reactions", Green Chemistry, Oct. 2009, vol. 11, No. 12, pp. 2041-2046 <DOI:10.1039/B918351P>.
Suhaimi, H. et al., "Preparation and characterization of polysulfone mixed-matrix membrane incorporated with palladium nanoparticles dispersed in polyvinylpyrrolidone for hydrogen separation", Journal of Polymer Research, May 2014 (available online Apr. 2014), vol. 21, article 428, 8 pages <DOI:10.1007/s10965-014-0428-1>.
Tang, Y. et al., "A biofilm model to understand the onset of sulfate reduction in denitrifying membrane biofilm reactors", Biotechnology and Bioengineering, Mar. 2013 (available online Oct. 2012), vol. 110, No. 3, pp. 763-772 <DOI:10.1002/bit.24755>.
Tang, Y. et al., "A Steady-State Biofilm Model for Simultaneous Reduction of Nitrate and Perchlorate, Part 1: Model Development and Numerical Solution", Environmental Science & Technology, Feb. 2012 (available online Jan. 2012), vol. 46, No. 3, pp. 1598-1607 <DOI:10.1021/es203129s>.
Tang, Y. et al., "A Steady-State Biofilm Model for Simultaneous Reduction of Nitrate and Perchlorate, Part 2: Parameter Optimization and Results and Discussion", Environmental Science & Technology, Feb. 2012 (available online Jan. 2012), vol. 46, No. 3, pp. 1608-1615 <DOI:10.1021/es203130r>.
Tang, Y. et al., "Comparing heterotrophic and hydrogen-based autotrophic denitrification reactors for effluent water quality and post-treatment", Water Supply, Mar. 2012, vol. 12, No. 2, pp. 227-233 <DOI:10.2166/ws.2012.138>.
Tsoligkas, A. et al., "Engineering Biofilms for Biocatalysis", ChemBioChem, Jun. 2011 (available online May 2011), vol. 12, No. 9, pp. 1391-1395 <DOI:10.1002/cbic.201100200>.
Valenzuela, L. et al., "Genomics, metagenomics and proteomics in biomining microorganisms", Biotechnology Advances, Mar.-Apr. 2006 (available online Nov. 2005), vol. 24, No. 2, pp. 197-211 <DOI:10.1016/j.biotechadv.2005.09.004>.
Van Den Berg, E. et al., "Enrichment of DNRA bacteria in a continuous culture", The ISME Journal, Apr. 2015, vol. 9, pp. 2153-2161 <DOI:10.1038/ismej.2015.26>.
Van Ginkel, S. et al., "Kinetics of nitrate and perchlorate reduction in ion-exchange brine using the membrane biofilm reactor (MBfR)", Water Research, Sep. 2008 (available online Jul. 2008), vol. 42, No. 15, pp. 4197-4205 <DOI:10.1016/j.watres.2008.07.012>.
Wan, R. et al., "Effect of CO2 on Microbial Denitrification via Inhibiting Electron Transport and Consumption", Environmental Science & Technology, Sep. 2016, vol. 50, No. 18, pp. 9915-9922 <DOI:10.1021/acs.est.5b05850>.
Wang, F. et al., "Kinetics and Mechanisms of Aggregative Nanocrystal Growth", Chemistry of Materials, Jan. 2014 (available online Sep. 2013), vol. 26, No. 1, pp. 5-21 <DOI:10.1021/cm402139r>.
Wang, K. et al., "Exploring the Water-Soluble Phosphine Ligand as the Environmentally Friendly Stabilizer for Electroless Nickel Plating", Industrial & Engineering Chemistry Research, Feb. 2009 (available online Jan. 2009), vol. 48, No. 4, pp. 1727-1734 <DOI:10.1021/ie801456f>.
Wang, Y. et al., "Adsorption and reduction of nitrate in water on hydrotalcite-supported Pd-Cu catalyst", Catalysis Today, Aug. 2007 (available online Jul. 2007), vol. 126, No. 3-4, pp. 476-482 <DOI:10.1016/j.cattod.2007.06.024>.

(56) References Cited

OTHER PUBLICATIONS

Watzky, M. et al., "Transition Metal Nanocluster Formation Kinetic and Mechanistic Studies. A New Mechanism When Hydrogen Is the Reductant: Slow, Continuous Nucleation and Fast Autocatalytic Surface Growth", Journal of the American Chemical Society, Oct. 1997, vol. 119, No. 43, pp. 10382-10400 <DOI:10.1021/ja9705102>.

Weber, K. et al., "Anaerobic redox cycling of iron by freshwater sediment microorganisms", Environmental Microbiology, Jan. 2006 (available online Aug. 2005), vol. 8, No. 1, pp. 100-113 <DOI:10.1111/i.1462-2920.2005.00873.x>.

Wei, W. et al., "Synergetic effects and flocculation behavior of anionic polyacrylamide and extracellular polymeric substrates extracted from *Klebsiella* sp. J1 on improving soluble cadmium removal", Bioresource Technology, Jan. 2015 (available online Oct. 2014), vol. 175, pp. 34-41 <DOI:10.1016/j.biortech.2014.10.044>.

Wilhelm, R. et al., "Microbial diversity of active layer and permafrost in an acidic wetland from the Canadian High Arctic", Canadian Journal of Microbiology, Apr. 2011, vol. 57, No. 4, pp. 303-315 <DOI:10.1139/w11-004>.

Witońska, I. et al., "Kinetic studies on the hydrogenation of nitrate in water using Rh/Al2O3 and Rh-Cu/Al2O3 catalysts", Kinetics and Catalysis, Nov. 2007, vol. 48, No. 6, pp. 823-828 <DOI:10.1134/S0023158407060109>.

Xie, W. et al., "Comparative metagenomics of microbial communities inhabiting deep-sea hydrothermal vent chimneys with contrasting chemistries", The ISME Journal, 2011 (available online Oct. 2010), vol. 5, pp. 414-426 <DOI:10.1038/ismej.2010.144>.

Yan, X. et al., "Formation and Stabilization of Palladium Nanoparticles on Colloidal Graphene Quantum Dots", Journal of the American Chemical Society, Oct. 2012 (available online Sep. 2012), vol. 134, No. 39, pp. 16095-16098 <DOI:10.1021/ja303730p>.

Yang, J. et al., "Competitive adsorption of heavy metals by extracellular polymeric substances extracted from *Klebsiella* sp. J1", Bioresource Technology, Nov. 2015 (available online Aug. 2015), vol. 196, pp. 533-539 <DOI:10.1016/j.biortech.2015.08.011>.

Yang, X. et al., "Green synthesis of palladium nanoparticles using broth of Cinnamomum camphora leaf", Journal of Nanoparticle Research, Jun. 2010, vol. 12, No. 5, pp. 1589-1598 <DOI:10.1007/s11051-009-9675-1>.

Yates, M. et al., "Exoelectrogenic biofilm as a template for sustainable formation of a catalytic mesoporous structure", Biotechnology & Bioengineering, Nov. 2014 (available online Apr. 2014), vol. 111, No. 11, pp. 2349-2354 <DOI:10.1002/bit.25267>.

Yates, M. et al., "Extracellular Palladium Nanoparticle Production using Geobacter sulfurreducens", ACS Sustainable Chemistry & Engineering, Sep. 2013 (available online Jun. 2013), vol. 1, No. 9, pp. 1165-1171 <DOI:10.1021/sc4000785>.

Yong, P. et al., "Bioaccumulation of palladium by Desulfovibrio desulfuricans", Chemical Technology and Biotechnology, May 2002 (available online Mar. 2002), vol. 77, No. 5, pp. 593-601 <DOI:10.1002/jctb.606>.

Yong, P. et al., "Biorefining of precious metals from wastes: an answer to manufacturing of cheap nanocatalysts for fuel cells and power generation via an integrated biorefinery?", Biotechnology Letters, Dec. 2010 (available online Aug. 2010), vol. 32, No. 12, pp. 1821-1828 <DOI:10.1007/s10529-010-0378-6>.

Yong, P. et al., "Palladium recovery by immobilized cells of Desulfovibrio desulfuricans using hydrogen as the electron donor in a novel electrobioreactor", Biotechnology Letters, Feb. 2002, vol. 24, No. 3, pp. 205-212 <DOI:10.1023/A:1014141610562>.

Zhang, R. et al., "Elucidation of Nitrate Reduction Mechanisms on a Pd-In Bimetallic Catalyst using Isotope Labeled Nitrogen Species", ChemCatChem, Jan. 2013 (available online Nov. 2012), vol. 5, No. 1, pp. 313-321 <DOI:10.1002/cctc.201200457>.

Zhang, Y. et al., "Hyperbranched Poly(amidoamine) as the Stabilizer and Reductant To Prepare Colloid Silver Nanoparticles in Situ and Their Antibacterial Activity", The Journal of Physical Chemistry C, Feb. 2008 (available online Jan. 2008), vol. 112, No. 7, pp. 2330-2336 <DOI:10.1021/jp075436g>.

Zhao, H-P. et al., "Effects of Multiple Electron Acceptors on Microbial Interactions in a Hydrogen-Based Biofilm", Environmental Science & Technology, Jul. 2013 (available online Jun. 2013), vol. 47, No. 13, pp. 7396-7403 <DOI:10.1021/es401310j>.

Zhao, H-P. et al., "Interactions between Perchlorate and Nitrate Reductions in the Biofilm of a Hydrogen-Based Membrane Biofilm Reactor", Environmental Science & Technology, Oct. 2011, vol. 45, No. 23, pp. 10155-10162 <DOI:10.1021/es202569b>.

Zhao, H-P. et al., "Using a Two-Stage Hydrogen-Based Membrane Biofilm Reactor (MBfR) to Achieve Complete Perchlorate Reduction in the Presence of Nitrate and Sulfate", Environmental Science & Technology, Jan. 2013, vol. 47, No. 3, pp. 1565-1572 <DOI:10.1021/es303823n>.

Zhou, C. et al., "Biofilm-enhanced continuous synthesis and stabilization of palladium nanoparticles (PdNPs)", Environmental Science: Nano, Oct. 2016, vol. 3, pp. 1396-1404 <DOI:10.1039/C6EN00308G>.

Zhou, C. et al., "Coupling of Pd nanoparticles and denitrifying biofilm promotes H2-based nitrate removal with greater selectivity towards N2", Applied Catalysis B: Environmental, Jun. 2017 (available online Jan. 2017), vol. 206, pp. 461-470 <DOI:10.1016/j.apcatb.2017.01.068>.

Zhou, C. et al., "Effect of growth conditions on microbial activity and iron-sulfide production by Desulfovibrio vulgaris", Journal of Hazardous Materials, May 2014 (available online Mar. 2014), vol. 272, pp. 28-35 <DOI:10.1016/j.ihazmat.2014.02.046>.

Zhu, G. et al., "Biological removal of nitrogen from wastewater", Reviews of Environmental Contamination and Toxicology, Feb. 2008, vol. 192, pp. 159-195.

Zhuang, W-Q. et al., "Recovery of critical metals using biometallurgy", Current Opinion in Biotechnology, Jun. 2015 (available online Apr. 2015), vol. 33, pp. 327-335 <DOI:10.1016/j.copbio.2015.03.019>.

Ziv-El, M. et al., "Water quality assessment of groundwater treated with a membrane biofilm reactor", Journal of the American Waterworks Association, Dec. 2009, vol. 101, No. 12, pp. 77-83 <DOI:10.1002/j.1551-8833.2009.tb10012.x>.

Zhou et al., "Palladium Recovery in a H2-Based Membrane Biofilm Reactor: Formation of Pd(0) Nanoparticules through Enzymatic and Autocatalytic Reductions", Environmental Science & Technology, 50:2546-2555 (Feb. 17, 2016).

De Corte, Simon et al., "Bio-palladium: from metal recovery to catalytic applications", Microbial Biotechnology, 5(1):5-17 (2012).

Chung, Jinwook et al., "Bio-reduction of soluble chromate using a hydrogen-based membrane biofilm reactor", Water Research, 40(8):1634-1642 (Mar. 27, 2006).

Chaplin, Brian P. et al., "Critical Review of Pd-Based Catalytic Treatment of Priority Contaminants in Water", Environ. Sci. Tecnol., 46:3655-3670 (2012).

Tang, Youneng et al., "Hydrogen permeability of the hollow fibers used in H2-based membrane biofilm reactors" Journal of Membrane Science, 407-408:176-183 (2012).

Zhou, Chen et al., "Uranium removal and microbial community in H2-based membrane biofilm reactor" Water Research, 64:255-264 (2014).

* cited by examiner

① Pure H₂ gas tank to feed the fiber bundles;
② Gas pressure regulator;
③ Main bundle with 50 fibers;
④ Coupon bundle with 10 fibers;
⑤ Feeding bottle;
⑥ Feeding pump;
⑦ Arrow indicates the flow direction;
⑧ Recirculation pump.

METHODS OF RECOVERING PLATINUM GROUP METALS FROM WASTE STREAMS

CROSS-REFERENCE TO RELATED APPLICATIONS

This application is the U.S. National Stage of International Application No. PCT/US2017/016179, filed Feb. 2, 2017, which claims the benefit of U.S. Provisional Patent Application No. 62/290,902, filed Feb. 3, 2016, the contents of each of which are incorporated herein by reference in their entireties.

FIELD OF THE INVENTION

The invention relates to systems and methods for removing and recovering precious metals, such as platinum-group metals (PGMs), from waste streams or wastewater. The invention also relates to systems and recycling methods for recycling the recovered precious metals for catalytic applications.

BACKGROUND OF THE INVENTION

To be called a "precious metal," the metal must be in limited supply. In the case, of platinum-group metals, their scarcity is enhanced by the growing demand for them in a variety of applications, including increasing industrial demand for platinum-group metals as catalysts. The growing demand has resulted in the value of these metals doubling since 2005 with great fluctuations in price. Due to the limited mining sources of platinum-group metals and the growing industrial demand, it is important to render platinum-group metal wastes usable, such as recovering useful states of platinum-group metal contaminants in waste water. Additionally, as the demand for platinum-group metals switches from the use of bulk material toward nanoparticles, there is a growing need for these Unfortunately, many practical limitations hinder the efficiency of recovering platinum-group metals from waste. Conventional methods of recovery (e.g. hydro- and pyrometallurgical processes) are expensive and require significant amounts of labor and time. Often, these methods also generate a secondary waste stream. Particularly, in the case of generating palladium nanoparticles, the conventional methods require the use of a series of toxic and expensive chemical agents. For examples, stabilizers (e.g., polyvinylpyrrolidone) and carrier materials (e.g., $Al_2O_3$), which are used to prevent the particles from aggregation, are released into the environment.

A promising alternative to chemically synthesizing palladium nanoparticles is exploiting microorganisms' ability to reduce metals. Waste palladium is palladium (II) (Pd(II) or $Pd^{2+}$), which microorganisms can reduce to the desirable palladium nanoparticle palladium (0) (Pd(0) or $Pd^0$). However, commercial application of such bioreduction of metals is also limited inefficiency and high cost. Waste streams containing palladium contaminants are often very acidic and limit sustainable bacterial growth. Furthermore, such waste streams contain other contaminants that limit the bioreduction of palladium. Existing solutions involve shifting the reduction of $Pd^{2+}$ to autocatalysis by "pre-palladizing" the bacteria with $Pd^0$. But, the high reactivity of palladium results in undesirable $Pd^0$ aggregates rather than nanoparticles. In addition to difficulties establishing the optimal bacterial population for bioreduction of palladium, the process is further limited by the obstacles in physically retaining the $Pd^0$ produced by the microorganisms. Existing bioreduction systems use suspended microorganisms to reduce $Pd^{2+}$ to $Pd^0$, but suspended microorganisms are poor at retaining solid $Pd^0$ nanoparticles. To improve retention or prevent leaching of the reduced metals, systems with suspended microorganisms must use a filter, for example a membrane separator. Thus, the challenge is finding a bioreduction process that reduces platinum-group metal contaminants and retains the reduced platinum-group metals in their highly catalytic nanoparticle form.

SUMMARY OF THE INVENTION

In one aspect, the invention is directed to a system for removing and harvesting platinum-group metal contaminants from a fluid. The fluid comprises a platinum-group metal contaminant, for example palladium contaminant. In another embodiment, the system comprises a membrane; an inoculant comprising a biofilm-forming population of microorganisms; and a hydrogen-gas source. The biofilm-forming population of microorganisms comprises a hydrogen oxidizer, an acidophile, and a microorganism that reduces platinum-group metals. In a particular embodiment, these microorganisms form a biofilm that is anchored to the membrane. In certain preferred embodiments, the membrane is a hollow fiber membrane; and, more specifically in these embodiments, the biofilm is anchored to the outer surface of the hollow fiber membrane. In some aspects, the membrane does not comprise any pore in its wall.

The hydrogen-gas source can be any reliable source of $H_2$ gas, for examples, the hydrogen gas source may comprise a gas tank having $H_2$ gas and a gas pressure regulator. The gas pressure regulator regulates the flow of $H_2$ gas from the gas tank to the membrane. For example, $H_2$ gas is delivered into the hollow fiber such that the $H_2$ gas is diffused to the biofilm through the membrane. The microorganisms of the biofilm utilize $H_2$ gas as the electron donor to reduce the platinum-group metal contaminant. The reduced platinum-group metal is also captured in the biofilm. In some implementations, the system further comprises a means of harvesting the reduced platinum-group metal from the biofilm. In some aspects, the means of harvesting the reduced platinum-group metal from the biofilm harvests the biofilm (the biomass of the system). The reduced platinum-group metal is harvested by separation from the biomass.

The system of the invention may further comprise a growth medium. The growth medium stimulates sufficient microbial growth to establish and/or maintain the biofilm. The growth medium comprises at least one nutrient selected from the group consisting of: $NH_4Cl$, $K_2HPO_4$, $CaCl_2$, $MgCl_2$, and $FeCl_2$. In some embodiments, the growth medium comprises a nitrate salt ($NO_3^-$) or a nitrite salt ($NO_2^-$). In some aspects, the growth medium comprises a nitrate salt ($NO_3^-$) or a nitrite salt ($NO_2^-$) and at least one nutrient selected from the group consisting of: $NH_4Cl$, $K_2HPO_4$, $CaCl_2$, $MgCl_2$, and $FeCl_2$.

In another aspect, the invention is directed to methods of removing platinum-group metal contaminants from a fluid. Preferably the method includes harvesting a platinum-group metal from platinum-group metal contaminant fluids. Preferably, the contaminant fluid is waste stream or wastewater containing such contaminants, preferably including specifically palladium contaminants.

In certain implementations, the methods comprise providing an aqueous system comprising a biofilm and a fluid comprising a platinum-group metal contaminant and contacting the aqueous system with hydrogen gas. Preferably, the biofilm comprises a hydrogen-oxidizing microorganism, an acidophilic microorganism, and a microorganism that reduces platinum-group metals, and the biofilm is anchored to a membrane. The method further comprises reducing the platinum-group metal contaminant, wherein the reduced platinum-group metal contaminant is captured in the biofilm. The method may also comprise harvesting the reduced platinum-group metal contaminant from the biofilm, which results in harvesting of platinum-group metal from platinum-group metal contaminant fluids.

In other implementation, the methods comprise providing an aqueous system comprising a hollow fiber membrane; inoculating the hollow fiber membrane with anaerobic sludge to establish a biofilm-forming population of microorganisms on the hollow fiber membrane; and providing the inoculated aqueous system with a denitrifying medium until the biofilm-forming population of microorganisms forms a biofilm. The resulting biofilm is capable of reducing platinum-group metal contaminants. The biofilm is also capable of capturing the resultant platinum-group metal. Hydrogen gas should be provided to the aqueous system during the establishment of the biofilm. The methods further comprise providing a fluid comprising platinum-group metal contaminants to the biofilm and reducing the platinum-group metal contaminant. In some implementations, methods additionally comprise harvesting the reduced platinum-group metal contaminant from the biofilm.

Alternatively, the biofilm capable of reducing platinum-group metal contaminants and of capturing the resultant platinum-group metal may be established in the fluid comprising platinum-group metal contaminants. In some implementations, the fluid comprising platinum-group metal contaminants supports the growth of the biofilm-forming population of microorganisms and may be used to establish a biofilm without a separate denitrifying medium.

During the reduction step, the microorganisms of the biofilm reduce platinum-group metal contaminant, using the hydrogen gas as the electron donor, preferably to a solid form, most preferably in the form of a nanoparticle. The resultant solid platinum-group metal is captured by the biofilm. The solid platinum-group metal may be stored within the microorganisms of the biofilm and/or trapped within the matrix of extracellular polymeric substance of the biofilm. Accordingly, the reduced platinum-group metal contaminant may be harvested by harvesting the biomass within the aqueous system, which comprises the biofilm.

DETAILED DESCRIPTION OF THE INVENTION

Figure 1:
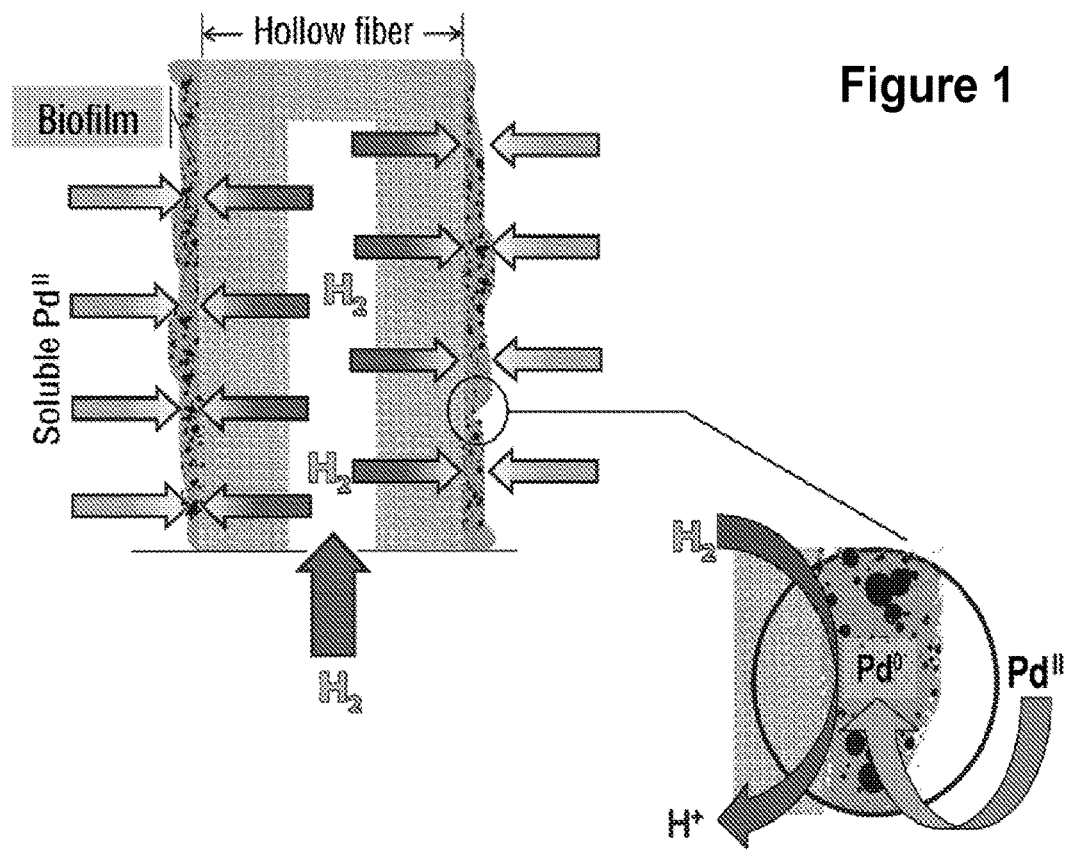
FIG. 1 illustrates a schematic of the vertical cross section of a hollow membrane filament with Pd-recovering biofilm in a membrane biofilm reactor (MBfR) system.

Detailed aspects and applications of the invention are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. It should be noted that there are many different and alternative configurations, devices and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

As used herein, the term "platinum-group metal" refers to ruthenium, rhodium, palladium, osmium, iridium, and platinum. "Platinum-group metal contaminants" refers to precious metals found in the environment, particular in in waters such as waste streams. For example, ruthenium contaminants in a fluid may be ruthenium (II), ruthenium (IV, or even ruthenium (III). Rhodium contaminants in a fluid may be rhodium (III) or perhaps rhodium (I) and rhodium (II). Palladium contaminants in a fluid may be palladium (II). Osmium contaminants in a fluid may be osmium (III), osmium (IV), and osmium (VI). Iridium contaminants in a fluid may be iridium (II) or iridium (IV). Platinum contaminants in a fluid may be platinum (II) or platinum (IV). In some embodiments, the preferred platinum-group metal is palladium.

As used herein, the term "denitrifying medium" refers to a growth medium comprising nitrate salt ($NO_3$) and/or a nitrite salt ($NO_2$). As the denitrifying medium is a growth medium, it also comprises nutrients to support microbial growth. In some embodiments, the nitrate in the denitrifying medium is from an inorganic nitrate salt, for example, sodium nitrate or potassium nitrate. In some embodiments, the denitrifying medium comprises between 0.5 to 2.0 mM nitrate or nitrite, for example about 0.5 mM, about 1.0, about 1.5 mM, or about 2.0 mM nitrate or nitrite. In other embodiments, the denitrifying medium comprises 10-70 mg $NO_3$—N/L (or $NO_2$—N/L), for example between 10-35 mg $NO_3$—N/L (or $NO_2$—N/L), 10-20 mg $NO_3$—N/L (or $NO_2$—N/L), preferably between 12-18 mg $NO_3$—N/L (or $NO_2$—N/L). For example, the denitrifying medium comprises 10 mg $NO_3$—N/L (or $NO_2$—N/L), 11 mg $NO_3$—N/L (or $NO_2$—N/L), 12 mg $NO_3$—N/L (or $NO_2$—N/L), 13 mg $NO_3$—N/L (or $NO_2$—N/L), 14 mg $NO_3$—N/L (or $NO_2$—N/L), 15 mg $NO_3$—N/L (or $NO_2$—N/L), 16 mg $NO_3$—N/L (or $NO_2$—N/L), 17 mg $NO_3$—N/L (or $NO_2$—N/L), 18 mg $NO_3$—N/L (or $NO_2$—N/L), 19 mg $NO_3$—N/L (or $NO_2$—N/L), or 20 mg $NO_3$—N/L (or $NO_2$—N/L). In preferred embodiments, the denitrifying medium comprises trace metals, for example a combination comprising at least one of the group consisting of: zinc, manganese, boron, cobalt, copper, nickel, molybdenum, and selenium.

As used herein, the term "sludge" refers to thick, soft, wet mud or a similar viscous mixture of liquid and solid components, especially the product of an industrial or refining process. For example, the process may be a wastewater reclamation process. Accordingly, the sludge may be from a wastewater reclamation plant. The sludge may also be anaerobic.

As used herein the term "Pd-biofilm" refers to biogenic Pd nanoparticles (PdNPs) associated with biofilm. As used herein, the term "Pd-film" refers to abiotic PdNPs alone.

The present invention addresses the current deficiencies in commercial application of bioreduction of platinum-group metal contaminants in wastewater. The invention efficiently removes platinum-group metal contaminants from wastewater and also harvests the useful solid forms of the platinum-group metal. More specifically, the invention involves microbial reduction of platinum-group metal contaminants wherein the platinum-group metal-reducing microorganism is in a biofilm. In preferred embodiments, the biofilm comprises a hydrogen-oxidizing microorganism, an acidophilic microorganism, and a microorganism that reduces platinum-group metals and the biofilm is anchored to a membrane. More preferably, the biofilm comprises a microorganism that is hydrogen-oxidizing and acidophilic and reduces platinum-group metals.

In some embodiments, the platinum-group metal contaminant reduced by the biofilm comprises palladium, for example Pd(II). For example, such a biofilm comprises at least one group of microorganism selected from the group consisting of consisting of: Methanobacteriales, Actinomycetales, Clostridiales, Bacteroidales, Flavobacteriales, Rhizobiales, Rhodospirillales, Burkholderiales, Rhodocyclales, Xanthomonadales, and Desulfovibrionales. In some aspects, the biofilm comprises at least one from the group consisting of: Rhodocyclaceae, Rhizobiales, Burkholderiales, Methanobacteriaceae, Mycobacteriaceae, Comamonadaceae, Bradyrhizobiaceae, Desulfovibrionaceae, and Xanthomonadaceae. More specifically, the biofilm comprises at least one from the group consisting of: *Dechloromonas, Desulfovibrio*, and Actinobacteria. In other embodiments, the biofilm comprises at least one group of microorganism selected from the group consisting of consisting of: methanbacteria, flavobacteria, α-proteobacteria, β-proteobacteria, and δ-proteobacteria. The methanobacteria may be Methanobacteriaceae. The flavobacteria may be Weeksellaceae. The α-proteobacteria may include Bradyrhizobiaceae, Hyphomicrobiaceae, and/or Rhodospirillaceae. The β-proteobacteria may include Comamonadaceae and/or Rhodocyclaceae. The δ-proteobacteria may be Desulfovibrionaceae.

In addition to the microorganism of the biofilm reducing platinum-group metal in its growth environment, the biofilm also captures the reduced platinum-group metal to prevent leaching of the reduced platinum-group metal. Thus, the methods of the invention resolve the issues with capturing the reduced platinum-group metal without the use of a membrane filter or some other filter to prevent leaching of the reduced platinum-group metal. Accordingly, in some implementations, the methods of the invention comprise providing an aqueous system comprising a biofilm and a fluid comprising a platinum-group metal contaminant; contacting the aqueous system with biofilm solids and hydrogen gas; and reducing the platinum-group metal contaminant, wherein the reduced platinum-group metal contaminant is captured in the biofilm. The fluid comprising a platinum-group metal contaminant may be wastewater or waste stream. The captured reduced platinum-group metal renders the system useful for nitrate removal. In particular, coupling Pd nanoparticle catalysis and microbial denitrification promoted $H_2$-based $NO_3^-$ reduction and led to greater selectivity towards $N_2$ as long as $H_2$ delivery was controlled. In non-steady-state $NO_3^-$-removal tests, Pd-biofilm removed $NO_3^-$ faster than just biofilm alone and Pd-film. In steady-state nitrate-removal tests, accurate tuning of the $H_2$ delivery capacity through bubbleless diffusion enabled highly efficient $H_2$ utilization for $NO_3^-$ reduction. When the $H_2$-delivery capacity was equal to or slightly greater than the demand for full reduction of $NO_3^-$ to $N_2$, nearly 100% removal of $NO_3^-$ and 100% selectivity for $N_2$ were achieved simultaneously. From a practical perspective, delivering $H_2$ by diffusion through bubbleless membranes enabled accurate control of N selectivity.

In some implementations, the methods of the invention comprise producing the biofilm that reduces platinum-group metal contaminants. In such embodiments, the methods of the invention comprise providing an anaerobic aqueous system comprising a hollow fiber membrane; inoculating the hollow fiber membrane with sludge to establish biofilm on the hollow fiber membrane; providing a fluid comprising platinum-group metal contaminants to the biofilm; contacting the aqueous system with hydrogen gas; and reducing the platinum-group metal contaminant, wherein the reduced platinum-group metal contaminant is captured in the biofilm. As nitrates are often present in waste stream or wastewater containing platinum-group metal contaminants, the fluid comprising platinum-group metal contaminant, in some embodiments, further comprises other contaminants, for example nitrate contaminants. In some embodiments, the sludge used to inoculate the aqueous system is anaerobic. For example, the anaerobic sludge is collected from a wastewater reclamation plant.

In some embodiments, the biofilm may be grown using a denitrifying medium. Accordingly, the methods of the invention may comprise providing an anaerobic aqueous system comprising a hollow fiber membrane; inoculating the hollow fiber membrane with anaerobic sludge to establish biofilm on the hollow fiber membrane; providing the inoculated aqueous system with a denitrifying medium until the biofilm is formed; providing a fluid comprising platinum-group metal contaminants to the biofilm; contacting the aqueous system with hydrogen gas; and reducing the platinum-group metal contaminant wherein the reduced platinum-group metal contaminant is captured in the biofilm.

In some implementations of the methods of the invention, the hollow fiber membrane comprises hollow fibers having an outer diameter of 200-300 μm, preferably 200-280 μm, for example 200 μm or 280 μm. The inner diameter of the hollow fibers of the hollow fiber membrane may be 100-110 μm. In some aspects, the cross sectional area of the hollow fibers of the hollow fiber membrane is 31,000-66,000 μm$^2$, for example 31,000-36,000 μm$^2$, 36,000-41,000 μm$^2$, 41,000-46,000 μm$^2$, 46,000-51,000 μm$^2$, 51,000-56,000 μm$^2$, 56,000-61,000 μm$^2$, 61,000-66,000 μm$^2$, or preferably 31,000-32,000 μm$^2$, 61,000-62,000 μm$^2$, 61,000-61,500 μm$^2$, 61,500-62,000 μm$^2$, or more preferably 31,400 μm$^2$ or 61,544 μm$^2$. The wall thickness of the hollow fibers of the hollow fiber membrane may be 50-70 μm, for example between 50-55 μm, 55-60 μm, 60-65 μm, 65-70 μm, or preferably between 55 μm, 55 μm, or 67 μm. In some embodiments, the hollow fiber membrane is made of composite material, polyester material, or polypropylene material. For example, the hollow fiber membrane comprises composite hollow fiber, a polyester hollow fiber, or a polypropylene hollow fiber. In some embodiments, the hollow fiber is nonporous. For example, the hollow fiber membrane does not comprise any pore in its wall.

The aqueous system comprising the biofilm is preferably an anaerobic system. However, in some implementations, the aqueous system may also be aerobic. Accordingly, the sludge need not be anaerobic. In fact, the aqueous system may be inoculated using wastewater/waste stream.

In some embodiments, the denitrifying medium is provided to the inoculated aqueous system at a flow rate of between 0.03-3.0 mL/min, preferably between 0.03-1.0 mL/min or between 0.03-0.10 mL/min. For example, the denitrifying medium is provided to the inoculated aqueous system at a flow rate of 0.03±0.01 mL/min, 0.04±0.01 mL/min, 0.05±0.01 mL/min, 0.06±0.01 mL/min, 0.07±0.01 mL/min, 0.08±0.01 mL/min, 0.09±0.01 mL/min, or 0.10±0.01 mL/min. In some aspects, the denitrifying medium is provided to the inoculated aqueous system at a flow rate of less than 0.1 mL/min or at a hydraulic retention time (HRT) of greater than 12 hours.

In some aspects, the denitrifying medium comprises trace metals. Thus in some implementations, the denitrifying medium may be supplemented with a trace metal solution. In some embodiments, the trace metal solution comprises, in mg/L, $ZnSO_4 \cdot 7H_2O$ 100, $MnCl_2 \cdot 4H_2O$ 30, $H_3BO_3$ 300, $CoCl_2 \cdot 6H_2O$ 200, $CuCl_2 \cdot 2H_2O$ 10, $NiCl_2 \cdot 6H_2O$ 10, $Na_2MoO_4 \cdot 2H_2O$ 30, and $Na_2SeO_3$ 30. In such embodiments, the denitrifying medium preferably comprises between 0.5-1.5 mL trace metal stock solution to 1 L of the denitrifying medium, preferably between 0.5-1.0 mL or between 0.75-1.0 mL trace metal stock solution to 1 L of the denitrifying medium.

In some aspects, establishing a biofilm capable of reducing platinum-group metal contaminants and capturing reduced platinum-group metals involves culturing the inoculated hollow fiber membrane with the denitrifying medium or the fluid comprising platinum-group metal contaminants for at least three weeks. Accordingly, the denitrifying medium is provided to the inoculated aqueous system for at least three weeks, for example three to four weeks. In some implementations, the denitrifying medium is provided to the inoculated aqueous system for longer periods, such as 160 days or six months.

In the methods of the invention, microbial reduction of platinum-group metal contaminants uses $H_2$ (hydrogen gas) as the electron donor. Compared to organic electron donors, $H_2$ is an advantageous electron donor due to its non-toxicity, lower biomass yield, lower cost, and negative $CO_2$ release. As adding organics to stimulate microbial activities causes membrane fouling and organic residuals in the effluent, using $H_2$ is particularly promising when recovering platinum-group metals from mining waste streams containing high level of soluble platinum-group metals contaminants but minimal organics. Accordingly, $H_2$ is a particularly promising electron donor when the level of soluble platinum-group metals soluble in a fluid comprising a platinum-group metal contaminant is greater than 100 mg/L and the level of organics is less than 10 mg/L dissolved organic carbon. In some embodiment, the level of soluble platinum-group metals may be greater than 110 mg/L, 120 mg/L, 130 mg/L, 140 mg/L, 150 mg/L, 160 mg/L, 170 mg/L, 180 mg/L, 190 mg/L, or 200 mg/L. In some implementations, the level of soluble platinum-group metals may be around 100 mg/L, 110 mg/L, 120 mg/L, 130 mg/L, 140 mg/L, 150 mg/L, 160 mg/L, 170 mg/L, 180 mg/L, 190 mg/L, or 200 mg/L. These ranges of soluble platinum-group metals in the fluid comprising a platinum-group metal contaminant are particularly true when the soluble platinum-group metal is palladium, especially Pd(II).

As wastewater or waste stream containing platinum-group metal contaminants are typically acidic, the fluid containing platinum-group metal contaminants used in the methods of the invention may be acidic as well as circumneutral. For example, the pH of the fluid containing the platinum-group metal contaminants may have a pH range of 2-8, preferably a pH range of 3-5 or a pH range of 3-4. In some implementations, the pH of the fluid containing the platinum-group metal contaminants is less than 7, for example a pH of 3.5, 3.6, 3.7, 3.8, 3.9, 4.0, 4.1, 4.2, 4.3, 4.4, or 4.5. The fluid containing the platinum-group metal contaminants may also have a circumneutral pH, such as a pH range of 6.5-7.5, for example a pH of 6.5, 6.6, 6.7, 6.8, 6.9, 7.0, 7.1, 7.2, 7.3, 7.4, or 7.5.

In the case of removal, $H_2$ can serve as the exclusive electron donor for concomitant catalytic activities of the recovered Pd(0). However, a possible drawback of using $H_2$ for bioreduction of Pd(II) is that $H_2$ (as well as formate) can stimulate the spontaneous abiotic reduction of Pd(II), which is not desirable when the most useful form of recovered palladium is a nanoparticle. Pd(II) can be reduced through autocatalysis in the presence of $H_2$ or formate. Continuous autocatalytic reduction on the nucleated Pd(0) leads to the production of large-size Pd(0) agglomeration with smaller specific surface area and thus attenuated reactivity. Nevertheless, as shown in Example 6, spontaneous abiotic reduction of Pd(II) can be controlled by controlling the rate of $H_2$ delivery, such as supplying $H_2$ at between 18.0-28.0 psi, preferably between 19.0-28.0 psi, between 20.0-28.0 psi, between 19.0-24.0 psi, between 20.0-24.0 psi, between 20.0-23.0 psi, between 19.0-20.0 psi, between 18.0-20.0 psi, between 20.0-21.0 psi, between 21.0-22.0 psi, between 22.0-23.0 psi, between 23.0-24.0 psi, between 24.0-25.0 psi, between 25.0-26.0 psi, between 26.0-27.0 psi, between 27.0-28.0 psi, about 19.8 psi, about 21.8 psi, about 23.0 psi, about 23.8 psi, or about 27.2 psi.

To ensure the most efficient reduction of the platinum-group metal contaminants in the fluid containing the platinum-group metal contaminants, the fluid should be provided to the aqueous system, specifically the biofilm. In bench-scale applications, the fluid should be provided at a flow rate of between 0.03-3.0 mL/min, preferably between 0.03-1.0 mL/min or between 0.03-0.10 mL/min. For example, the fluid is provided to the aqueous system or the biofilm at a flow rate of 0.03±0.01 mL/min, 0.04±0.01 mL/min, 0.05±0.01 mL/min, 0.06±0.01 mL/min, 0.07±0.01 mL/min, 0.08±0.01 mL/min, 0.09±0.01 mL/min, or 0.10±0.01 mL/min. However, in bench-scale applications, the fluid containing the platinum-group metal contaminants may initially be provided at a range of between 3-45 mL/min to load the aqueous system with the platinum-group metal contaminants. This period of high flow rate may last between 2 to 31 days, preferably between 2-21 days, 2-10 days, 2-5 days, or 2 days. Alternatively, the rate in which the fluid containing the platinum-group metal contaminants is provided to the system in bench-scale applications should establish a surface loading ranging from 1.4 to 14.3 g platinum-group metal contaminant/$m^2$-day.

In addition to platinum-group metal contaminants from a fluid such as wastewater, the methods of the invention can also harvest the platinum-group metal removed from the fluid. As the reduced platinum-group metal is captured on the biofilm, the reduced platinum-group metal may be harvested by harvesting the biomass, which comprises the biofilm, by methods well established in the prior art. Harvesting of the reduced platinum-group metal is highly preferable as the reduced platinum-group metal is ready for commercial application. Specifically, the reduced platinum-group metal is reduced to a solid state and is captured on the biofilm in a solid state. In some implementations, the reduced solid platinum-group metal is nanoparticles, which is a significant improvement from other methods of reducing platinum-group metal contaminants. Even in comparison with other methods of bioreducing platinum-group metal contaminants, the methods of invention ensure high production of platinum-group metal nanoparticles rather than platinum-group metal aggregates.

In some aspects, the methods of invention may also potentiate the removal of other wastewater or waste stream contaminants. The capturing of platinum-group metal contaminants by the biofilm catalyzes the reduction of other contaminants, for example nitrate or chlorinated contaminants.

The invention is also directed to a system for removing and harvesting platinum-group metal contaminants from a fluid. The fluid comprises a platinum-group metal contaminant. In one embodiment, the system comprises a biofilm anchored to a membrane and a hydrogen gas source. The biofilm comprises a hydrogen-oxidizing bacterium, an acidophilic bacterium, and a bacterium that reduces platinum-group metals. In a preferred embodiment, the biofilm comprises a microorganism that reduces palladium (II) (Pd (II)). In another embodiment, the system comprises a membrane; an inoculant comprising a biofilm-forming population of microorganisms; and a hydrogen gas source. The biofilm-forming population of microorganisms comprises a hydrogen-oxidizing microorganism, an acidophilic microorganism, and a microorganism that reduces platinum-group metals. For example, the inoculant comprises at least one microorganism population selected from the group consisting of: Methanobacteriales, Actinomycetales, Clostridiales, Bacteroidales, Flavobacteriales, Rhizobiales, Rhodospirillales, Burkholderiales, Rhodocyclales, Xanthomonadales, and Desulfovibrionales. In some aspects, the inoculant comprises at least one microorganism population selected from the group consisting of: Rhodocyclaceae, Rhizobiales, Burkholderiales, Methanobacteriaceae, Mycobacteriaceae, Comamonadaceae, Bradyrhizobiaceae, Desulfovibrionaceae, and Xanthomonadaceae. In some embodiments, the inoculant comprises at least one microorganism population selected from the group consisting of: *Dechloromonas, Desulfovibrio*, and Actinobacteria. In other embodiments, for example in a system also suitable for nitrate removal, the biofilm comprises at least one group of microorganism selected from the group consisting of consisting of: methanobacteria, flavobacteria, α-proteobacteria, β-proteobacteria, and δ-proteobacteria. The methanobacteria may be Methanobacteriaceae. The flavobacteria may be Weeksellaceae. The α-proteobacteria may include Bradyrhizobiaceae, Hyphomicrobiaceae, and/or Rhodospirillaceae. The β-proteobacteria may include Comamonadaceae and/or Rhodocyclaceae. The δ-proteobacteria may be Desulfovibrionaceae.

The membrane of the system is a hollow fiber membrane in preferred embodiments. In some aspects, the biofilm is anchored to the outer surface of the hollow fiber membrane. In some embodiments, the membrane comprises polypropylene fibers and has a permeability of $1.8 \times 10^7$ $m^3$ $H_2 \cdot m$ membrane thickness/$m^2$ hollow fiber surface area·d·bar at standard temperature and pressure. In some aspects, the membrane of the system is nonporous, for example, the membrane lacks pores in its walls. In some embodiments, the outer diameter of the hollow fiber membrane is about 200 µm; the inner diameter of the hollow fiber membrane is about 100-110 µm; and the wall thickness of the hollow fiber membrane is about 50-55 µm.

In some embodiments, the hydrogen gas source comprises a gas tank comprising pure $H_2$ gas and a gas pressure regulator. The gas pressure regulator regulates the flow of $H_2$ gas from the gas tank to the membrane. For example, $H_2$ gas is delivered into the hollow fiber such that the $H_2$ gas is diffused to the biofilm through the membrane. The microorganisms of the biofilm utilize $H_2$ gas as the electron donor to reduce the platinum-group metal contaminant (see FIGS.

1 and 2). The reduced platinum-group metal is also captured in the biofilm (FIG. 1). In preferred embodiments, the gas regulator is capable of supplying H$_2$ at between 18.0-28.0 psi, preferably between 19.0-28.0 psi, between 20.0-28.0 psi, between 19.0-24.0 psi, between 20.0-24.0 psi, between 20.0-23.0 psi, between 19.0-20.0 psi, between 18.0-20.0 psi, between 20.0-21.0 psi, between 21.0-22.0 psi, between 22.0-23.0 psi, between 23.0-24.0 psi, between 24.0-25.0 psi, between 25.0-26.0 psi, between 26.0-27.0 psi, between 27.0-28.0 psi, about 19.8 psi, about 21.8 psi, about 23.0 psi, about 23.8 psi, or about 27.2 psi.

The system may further comprise a peristaltic pump. The peristaltic pump recirculates the fluid through the system. In preferred embodiments, the peristaltic pump can recirculate the fluid at a rate of 150 mL/min. The system may further comprise tubing, for example PVC tubing. For bench-scale applications, the tubing is capable of providing an influent feed rate within the range of 0.03-3.00 mL/min.

In some implementations, the system further comprises a means of harvesting the reduced platinum-group metal from the biofilm. In some aspects, the means of harvesting the reduced platinum-group metal from the biofilm harvests the biofilm (the biomass of the system). The reduced platinum-group metal is harvested by separation from the biomass.

The system of the invention may further comprise a growth medium. The growth medium stimulates sufficient microbial growth to establish and/or maintain the biofilm. The growth medium comprises at least one nutrient selected from the group consisting of: NH$_4$Cl, K$_2$HPO$_4$, CaCl$_2$, MgCl$_2$, FeCl$_2$, MgSO$_4$, ZnSO$_4$, MnCl$_2$, H$_3$BO$_3$, CoCl$_2$, CuCl$_2$, NiCl$_2$, Na$_2$MoO$_4$, and Na$_2$SeO$_3$. In some embodiments, the growth medium comprises NH$_4$Cl, K$_2$HPO$_4$, CaCl$_2$, MgCl$_2$, and FeCl$_2$. The growth medium may further comprise a nitrate salt (NO$_3$) or a nitrite salt (NO$_2$).

The present invention is further illustrated by the following examples that should not be construed as limiting. The contents of all references, patents, and published patent applications cited throughout this application, as well as the Figures, are incorporated herein by reference in their entirety for all purposes.

EXAMPLES

Example 1. Recovery of Pd from Acidic Waste Streams Using a H$_2$-Fed MBfR

H$_2$ is used as the electron donor because it is nontoxic, provides low biomass yields, and can be oxidized by diverse microorganisms adapted to varied environments (e.g., substrate, salinity, pH, etc.). As shown in FIG. 1, MBfR provides a large surface area for the biofilm and support slow growth of acidophilic metal-reducing microbes. The MBfR efficiently delivers H$_2$ to a biofilm by diffusion through the walls of bubble-less gas-transfer membranes. The demand for H$_2$ to reduce electron acceptors is the driving force to pull H$_2$ through the membrane, and the H$_2$-delivery capacity to the biofilm can be controlled simply by adjusting the H$_2$ pressure. The MBfR was successful for analogous applications to long-term immobilization of soluble heavy metals including chromate [Cr(VI)] and uranyl [U(VI)].

Soluble Pd(II) can be immobilized into the biofilm through concomitant enzymatic and autocatalytic reductions to insoluble Pd(0):

(1)

Figure 3:
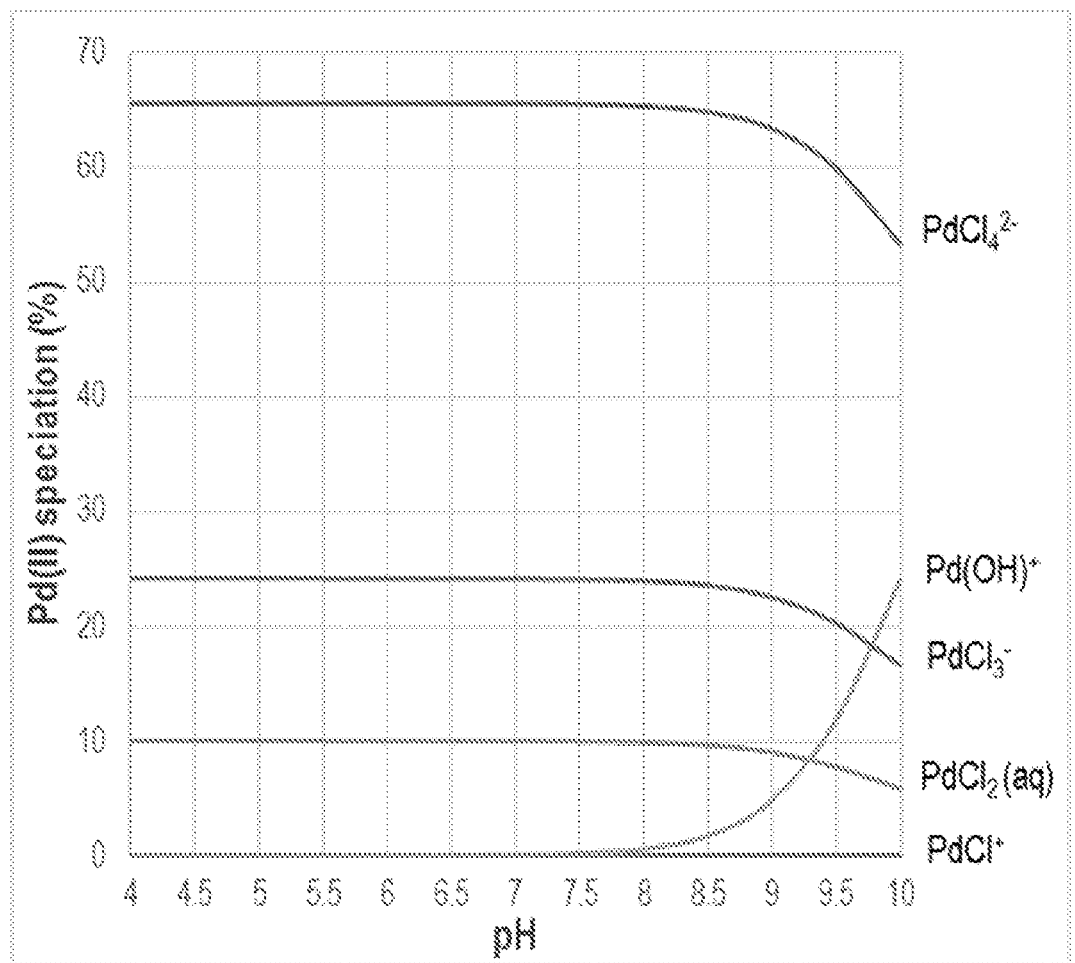
FIG. 3 shows Pd(II) speciation as a function of pH computed by Visual MINTEQ, with the default [Pd (II)]$_{total}$=0.002 M, [Cl$^-$]$_{total}$=0.02 M, ionic strength (I)=0.03 M, and temperature (T)=22° C.

The acidophilic H$_2$-oxidizing microorganisms in the MBfR biofilm actively respire Pd through dissimilatory Pd(II) reduction. In addition, under acidic conditions, the protonized amine or carboxyl functional groups on cell surfaces or the biogenic extracellular polymeric substrates (EPS) can adsorb chloropalladium(II) anions (PdCl$_4^{2-}$ and PdCl$_3^-$), the predominant Pd(II) species at lower pH, as shown in FIG. 3. The adsorptive immobilization of Pd(II) ions accelerates the subsequent autocatalytic Pd(II) reduction.

The MBfR device is capable of long-term retention and preservation of nano-particulate Pd(0) under high surface loadings.

MBfR Setup

Figure 2:
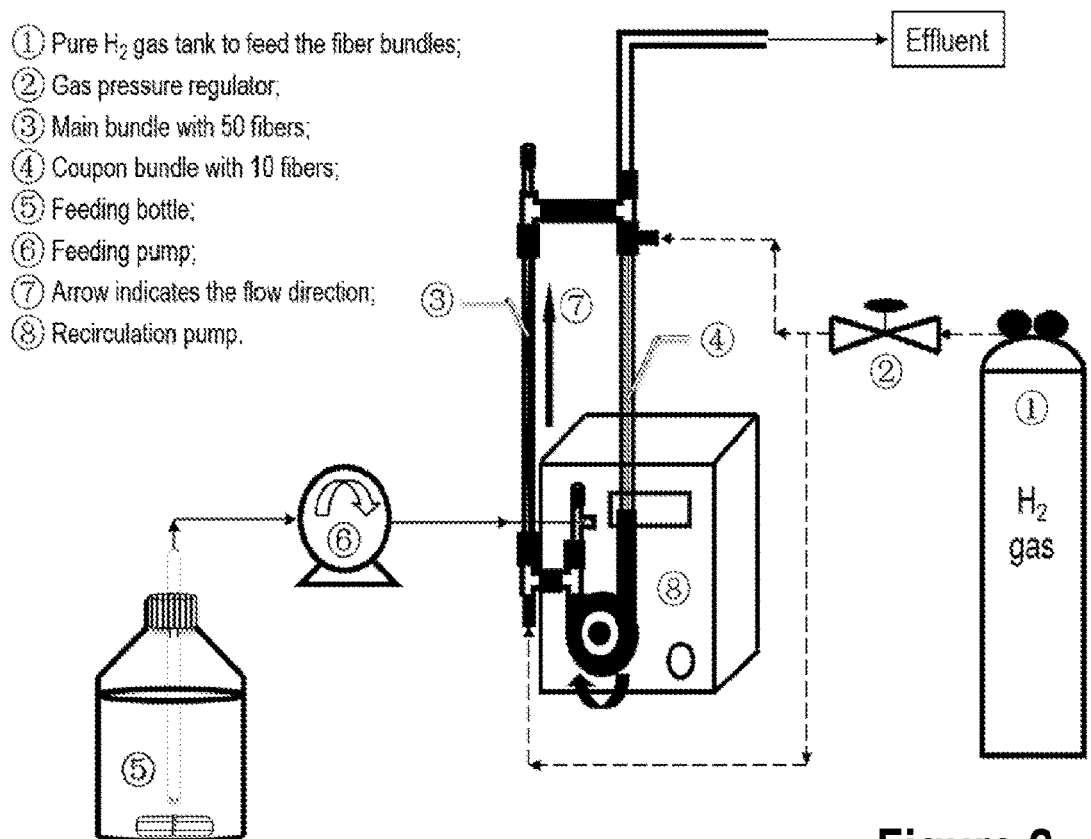
FIG. 2 illustrates a schematic of the bench-scale MBfR system.

A schematic of the exemplary MBfR apparatus used for Pd recovery is shown in FIG. 2. The MBfR system consists of two glass tubes connected with Norprene tubing, polycarbonate stopcocks, and plastic barbed fittings. The total working volume of the MBfR was 60 mL. One glass tube contained a main bundle of 50 hollow-fiber membranes (nonporous polypropylene fiber, 200 μm OD, 100-110 μm ID, wall thickness 50-55 μm; Teijin, Ltd., Japan), each 25 cm long. Biofilm samples are collected by cutting short lengths of a separate fiber from the "coupon" bundle of 10 fibers, located in the second glass tube. This allowed sample collection without disturbing the main bundle of fibers and without causing a significant change in total biofilm surface area (94.2 cm$^2$) in the reactor. The experimental permeability of the polypropylene fiber was 1.8×10$^{-7}$ m$^3$ H$_2$·m membrane thickness/m$^2$ hollow fiber surface area·d·bar at standard temperature and pressure. For the main fiber bundle, both ends were glued into an H$_2$-supply manifold. For the "coupon" bundle, the top was glued into an H$_2$-supply manifold, but the bottom was sealed and not fixed to the end of the tube.

Premixed gas (80% H$_2$/20% CO$_2$) was supplied to the fiber bundles of the MBfR, with the pressure adjusted by a stainless steel gas regulator (KCY, Swagelok, U.S.A.). A peristaltic pump (Rainin Dynamax Peristaltic pump, model RP-1) and PVC tubing (Rainin Silicone pump tube, Yellow Blue) provided an influent feed rate within the range of 0.03-3.00 mL/min. The MBfR was well mixed using a recirculation rate of 150 mL/min achieved with a peristaltic pump (Master Flex, model 7520-40, Cole-Parmer Instrument Company, U.S.A.); therefore, the solute concentrations inside an MBfR was equal to its effluent concentrations.

Feeding, Inoculation, and Operation

We prepared and stored the influent in one 5-L glass bottle (VWR, Radnor, Pa.) and maintained an airtight seal with a rubber stopper that provided one outlet from the liquid phase and one inlet to the headspace. Immediately after it was autoclaved for deoxygenation and sterilization, the medium bottle was sparged by pure N$_2$ gas until the liquid cooled to room temperature. N$_2$ gas was supplied subsequently to the headspace at <2 psig (or ~1.1 atm total pressure); this small positive pressure in the sealed medium bottle minimized oxygen intrusion from outside. The details of electron acceptors (i.e., nitrate, Pd), buffer types (i.e., carbonate, phosphate), HRT, and pH for 118 different types of feeding influents are described in Table 1.

Stage 0: Denitrification and biofilm formation. The denitrifying medium consisted of (in mM) NaNO$_3$ 1, K$_2$HPO$_4$ 1.5, CaCl$_2$ 0.002, MgCl$_2$ 0.01, FeCl$_2$ 0.01, and MgSO$_4$ 0.002, plus 1 mL/L trace metal stock solution. We used anaerobic sludge from the Mesa Northwest Wastewater Reclamation Plant (Mesa, Ariz., USA) as the inoculum. Immediately after inoculation, we started to feed the reactor with denitrification medium having ~14 g NO$_3$—N/L nitrate as the sole electron acceptor. We kept constant the flow rate (0.08±0.01 mL/min) and the H$_2$ pressure (20 psig; i.e. 27.2 psi H$_2$ or 1.9 atm absolute pressure) for 160 days. A thick biofilm formed on the fiber surface, and nitrate removal was consistent.

Stage 1: Pd recovery from the waste stream amended with lower phosphate. We fed the MBfR with a synthetic waste stream featuring ~200 mg/L Pd(II) as Na$_2$PdCl$_4$ and a pH of 3.8. In order to effectively stimulate microbial growth, we amended the stream with the same nutrients as in the denitrifying medium, but replaced 1 mM NaNO$_3$ with 0.1 mM NH$_4$Cl. The 1.5-mM phosphate provided sufficient P, but the buffering was inadequate to neutralize all the acid produced during Pd(II) reduction,

$$PdCl_4^{2-} + H_2 \rightarrow 2H^+ + 4Cl^- \qquad (2)$$

Thus, we expected an acidic environment at steady state, similar to contaminated sites.

Stage 2: Pd recovery from the waste stream amended with 137 higher phosphate buffer. For Stage 2, we fed the MBfR with the same synthetic waste stream, but amended it with 3.5 more mM phosphate than in Stage 1. Thus, a total of 5 mM phosphate was sufficient to buffer the system at circumneutral environment with full Pd(II) reduction at the steady state.

During both Pd stages (stages 1 and 2), we kept constant the flow rate (0.04±0.01 mL/min) except for some times of batch conditions (no flow).

Results

1. Nanoparticulate Pd(0) Formation in the Biotic MBfR

Figure 6:
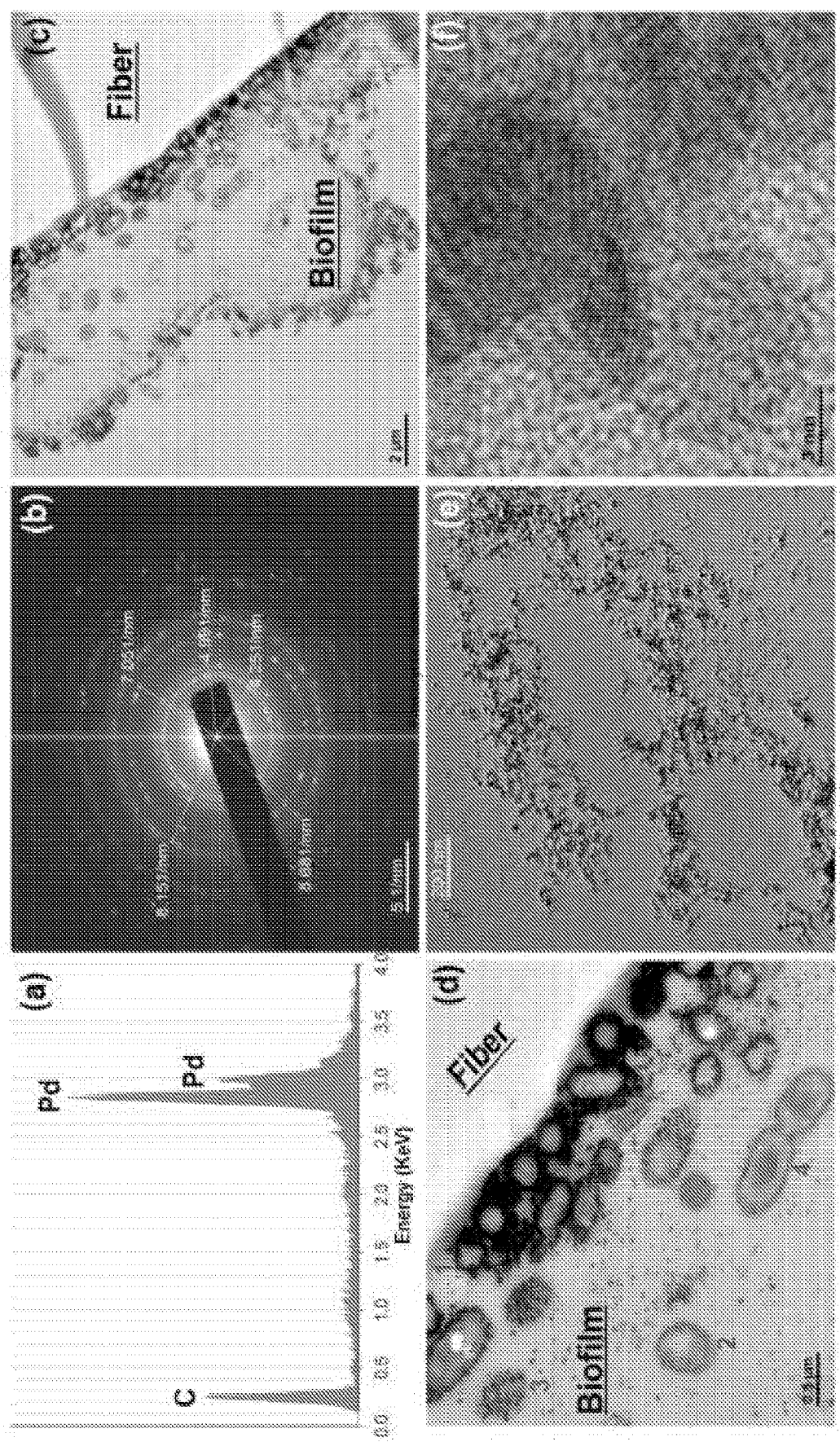
FIG. 6 shows TEM images of an ultramicrotomed cross section of a single fiber with biofilm fixed and cut at the end of Stage 1. (a) The EDX spectrum of the whole area; (b) SAED pattern indexing Pd(0) crystallites; (c) boundary of the fiber and the biofilm (5,600×); (d) a selected area (19,500×) with Pd(0) aggregates associated with microbial cells; (e) a selected area (12,000×) with Pd(0) crystallites associated with EPS; and (f) the lattice fringes of the Pd(0) crystallites associated with EPS (300,000×).

The presence of Pd was confirmed by the EDX spectrum of the whole biofilm area (FIG. 6a). Also, the absence of any Raman bands in the solids at both stages reflects the nature of a pure metal, and it excludes the possibility of noticeable Pd(II) recovered by the biofilm, either in any form of adsorbed Pd(II) complexes or PdO precipitates as possible unreduced products. The crystallinity of metallic Pd(0) also could be identified and quantified. Together with the selected-area electron-diffraction (SAED) patterns (FIG. 6b) featuring identical d-spacings, confirms that crystalline metallic Pd dominated the solid products. The estimated average sizes of the Pd(0) crystallites at Stages 1 and 2 were 8.3±0.3 and 11.6±0.3 nm, respectively, values close to those of most biogenic Pd(0).

TEM images (FIGS. 6c-6d) further characterize the size, morphology, and location of biogenic Pd(0) associated with the biofilm. They reveal distinct heterogeneity in the direction perpendicular to the fiber surface. In general, larger-sized Pd aggregates associated with the microbial cells tended to gather towards the fiber surface, while a majority of smaller-sized Pd(0) crystallites are associated with EPS and scattered farther from the fiber; FIG. 6c, a representative section including the fiber and the biofilm in full depth gives, a visual overview of this trend. A closer examination of the fiber-biofilm boundary (FIG. 6d) further reveals that nanoparticulate Pd(0) associated with microbial cells mainly was mostly located on cell walls and/or in periplasmic spaces (cell examples #1-2), although occasionally occurred in the cytoplasm (#3). The size of Pd(0) varied from intercellular crystallites of several nanometer in diameter to more than 100 nm aggregates on cells directly attached to the fiber. The image also caught a Pd-decorated live cell undergoing binary fission (#4), which indirectly adds more supports that the bacteria grew via respiratory Pd(II) reduction even under the acidic condition. In the very outside layer of the biofilm, on the contrary, the predominant Pd(0) was poorer crystallites trapped in EPS (FIG. 6e). The thickness of individual crystallites, estimated from the characteristic lattice fringes (FIG. 6f) dominated by the (2 0 0) d-spacing of 2.01±0.04 Å, was 7.8±0.7 nm (very close to the XRD estimation).

2. Microbial Community Shaped by e$^-$ Acceptor and pH

Figure 7:
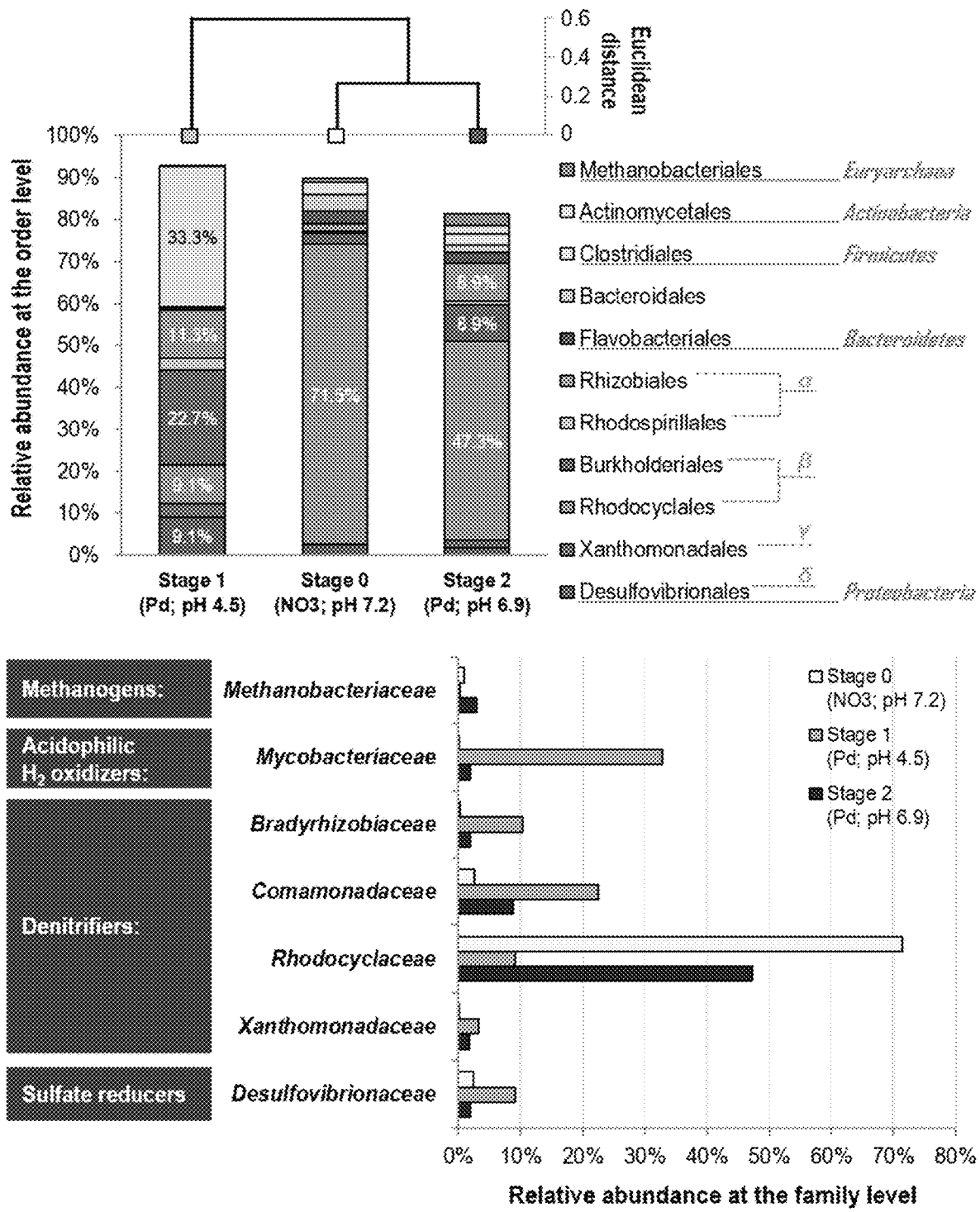
FIG. 7 shows phylogenetic profiling of the biofilms at the levels of order (vertical bars in middle) and family (horizontal bars at the bottom); and clustering based on the unweighted UniFrac analyses (branch lines on the top). Abundance values of the substantial (>5%) orders are labeled. Unknown or <2% phylotypes are not shown.

The microbial community structures along with the UniFrac analyses (FIG. 7) of the biofilms show that, despite of similar Pd recovery for both steady states, Pd reduction alone had only a modest impact on the microbial community at circumneutral pH, but a pH as low as 4.5 greatly shifted the microbial community.

Denitrifiers dominated the denitrifying and the Pd(II)-reducing biofilms at neutral pH. In the denitrifying biofilm (Stage 0), the large majority of sequences belonged to the order Rhodocyclales (β-proteobacteria; 71.5% of the whole community), with sequences clustering into the sole family Rhodocyclaceae dominated by *Dechloromonas* (61.6%), a typical genus in denitrifying MBfR biofilms. In the Pd(II)-reducing biofilm at similarly circumneutral pH (Stage 2), Rhodocyclaceae, though less abundant than in Stage 0, was still the most abundant group (47.3%) dominated by *Dechloromonas* (39.2%). Though no research has directly tested enzymatic Pd(II) reduction using any pure *Dechloromonas* spp., their ability to respire other metals suggests that they could have been the leading Pd(II)-reducers in the MBfR biofilm at least at near-neutral pH. In addition, two other denitrifying families, Rhizobiales and Burkholderiales, were noticeably enriched after Pd treatments under both pH conditions, and probably were responsible for enzymatic Pd(II) reduction as well. Methanogenic archaea affiliated with the family Methanobacteriaceae became three times more abundant in Stage 2 (2.8%) than in Stage 0 (0.9%); this trend, similar to what was observed in a TCE-dechlorinating biofilm, probably resulted from the methanogen's slow growth rate.

More diverse microbial community observed for Pd(II) reduction at acidic pH. In the Pd(II)-reducing biofilm at acidic pH (Stage 1), the abundance of the Rhodocyclaceae family dropped sharply to 9.1%. In their place, the large majority of sequences shifted to the Gram-positive Actinobacteria commonly abundant in acidic and metal-rich environments with sequences mostly clustering into the order Actinomycetales (33.3%) containing the dominant family Mycobacteriaceae (32.8%). The other acid-tolerant phylotypes with noticeably enhanced abundances were two groups of denitrifying proteobacteria: the order Burkholderiales (22.7%) dominated by the family Comamonadaceae (22.5%) and the order Rhizobiales (11.3%) dominated by the family Bradyrhizobiaceae (10.3%), both reported abundant in natural acidic environments (pH<5) particularly with metal contamination. Perhaps surprising was the greater abundance (8.7%) of *Desulfovibrio* spp., a dominant group affiliated with gram-negative sulfate-reducing bacteria (SRB), at acidic pH (1.4% for Stage 0 and 0.1% for Stage 1-2); only one newly discovered *Desulfovibrio* sp is known to tolerate such low pH levels. As several *Desulfovibrio* spp. have been reported capable of Pd(II) reduction the spike of their genetic abundance implies that these SRB potentially were able to respire Pd(II), probably compensating for the loss of Pd(II)-reducing denitrifiers at the acidic pH; however, as commonly observed, the SRB were outcompeted again by these faster growing denitrifiers after the pH increased back to neutral (Stage 2).

Acidic pH shaped microbial community more sharply than Pd. The unweighted UniFrac analyses in FIG. 7, based on the presence or absence of all the phylotypes within the biofilm sample for each condition, quantitatively revealed the main drivers for the shifts in microbial structures. The biofilms at circumneutral pH (Stages 0 and 2), though fed with different e− acceptors, formed a cluster distinct from the biofilm at acidic pH (Stage 1). In other words, the considerable change in pH between the Pd-recovering stages (1 and 2) led to greater shift of microbial communities.

Practical Implications

Pd(II) was reduced to Pd(0), which was spontaneously incorporated in the biofilm without losing the quantity or quality of the nano-particulate Pd(0). Pd reduction and recovery were nearly 100% whether the pH was near 7 or near 4.5, with an average rate of 1.3 g/m$^2$ membrane/day at steady state. The biofilm community was affected by low pH, but rapidly returned to its Pd(II)-reducing structure and function when neutral pH was restored.

The heterogeneous distribution of Pd(0) morphology and size was similar to what was observed in the U(VI)-reducing MBfR, and it can be partly attributed to the special counter-diffusional nature of the biofilm of an MBfR. The continuous demands and consumption of $H_2$ by microorganisms drove $H_2$ diffusion throughout the biofilm and thus kept $H_2$ concentrations gradient towards the outside of the biofilm, a reversed direction of Pd diffusion through biofilm towards the substratum. With this scenario, relatively high local $H_2$, along with limited local Pd(II), favored autocatalysis due to its to the high affinity for Pd(II) reduction by $H_2$. Thus, the predominant autocatalytic Pd(II) reduction over the enzymatic process produced larger-sized Pd(0) and allowed longer term Pd(0) aggregation near the fiber-biofilm boundary.

The average crystallite size of the biogenic Pd(0) in this MBfR fed with Pd(II) for over one month was similar to (and in some cases smaller than) those produced in suspending batch systems with hour-level experimental durations. This phenomenon indicates that MBfR biofilms were capable of long-term preservation of nano-particulate metals with large specific surface areas and consequent potential activities by effectively retarding their crystallization processes and preventing their agglomeration during the nucleation step. The underlying mechanism may be connected to some unknown special characteristics of EPS which comprise a large fraction of biomass in biofilm (40-50% times higher than in suspensions) and are practically utilized as an efficient metal adsorbent.

Example 2. Biofilm Enhanced Pd Recovery Capacity

Figure 5:
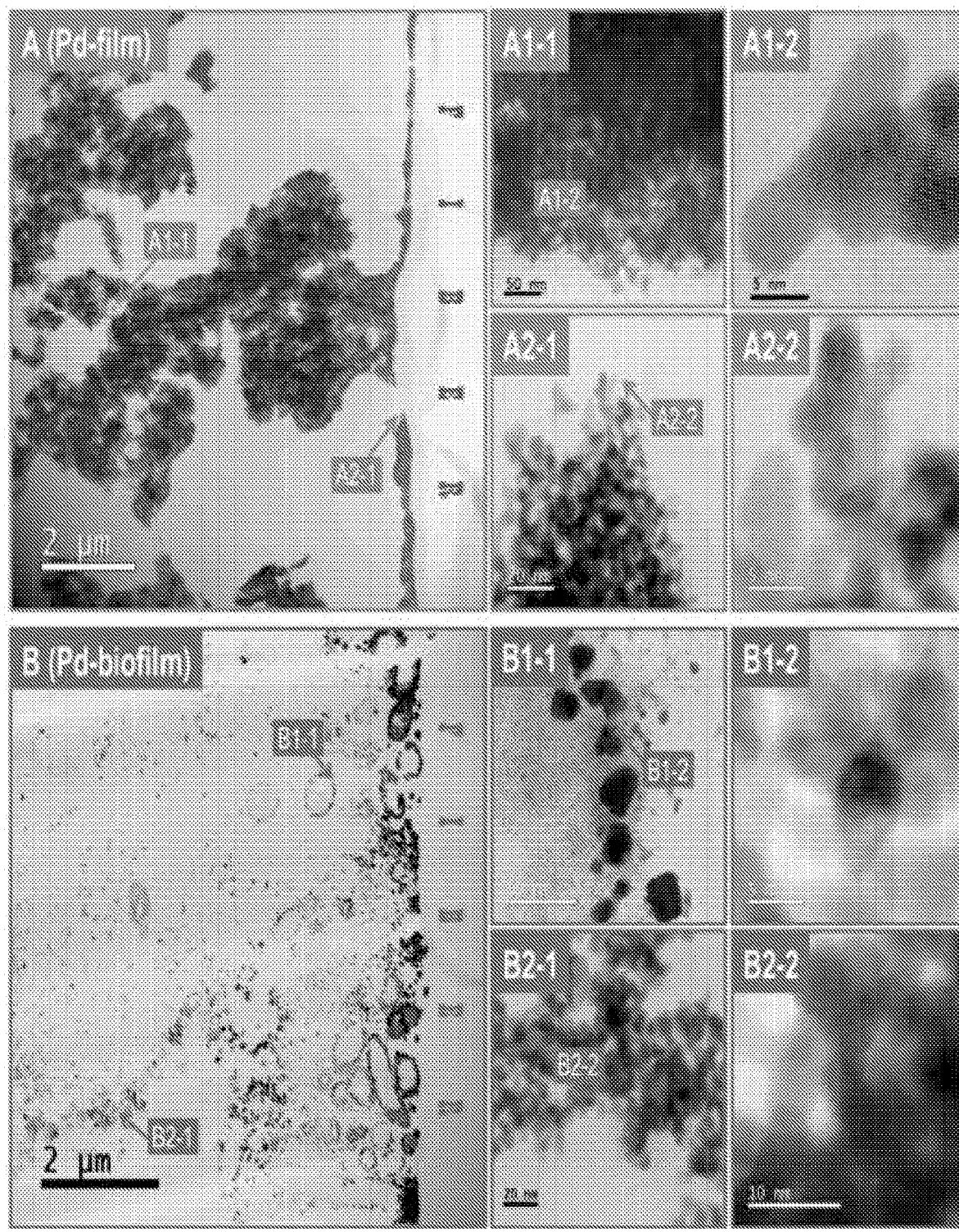
FIG. 5 shows scanning transmission electron microscopy (STEM) images of the cross section of a single fiber in each reactor.

We also tested five conditions (SS1-SS5) with constant influential Pd(II) concentrations (204±21 mg/L), but flow rates from 3 to 45 mL/min (FIG. 5), which gave consequent Pd(II) surface loadings from 26 to 270 e− mEq/m$^2$-day (or 1.4 to 14.3 g/m$^2$-day) (FIG. 6) in two identical reactors but one with biofilm (PdM-B) and one without biofilm (PdM-A). Table 2 summarizes the average performance parameters at steady state of each condition.

Figure 4:
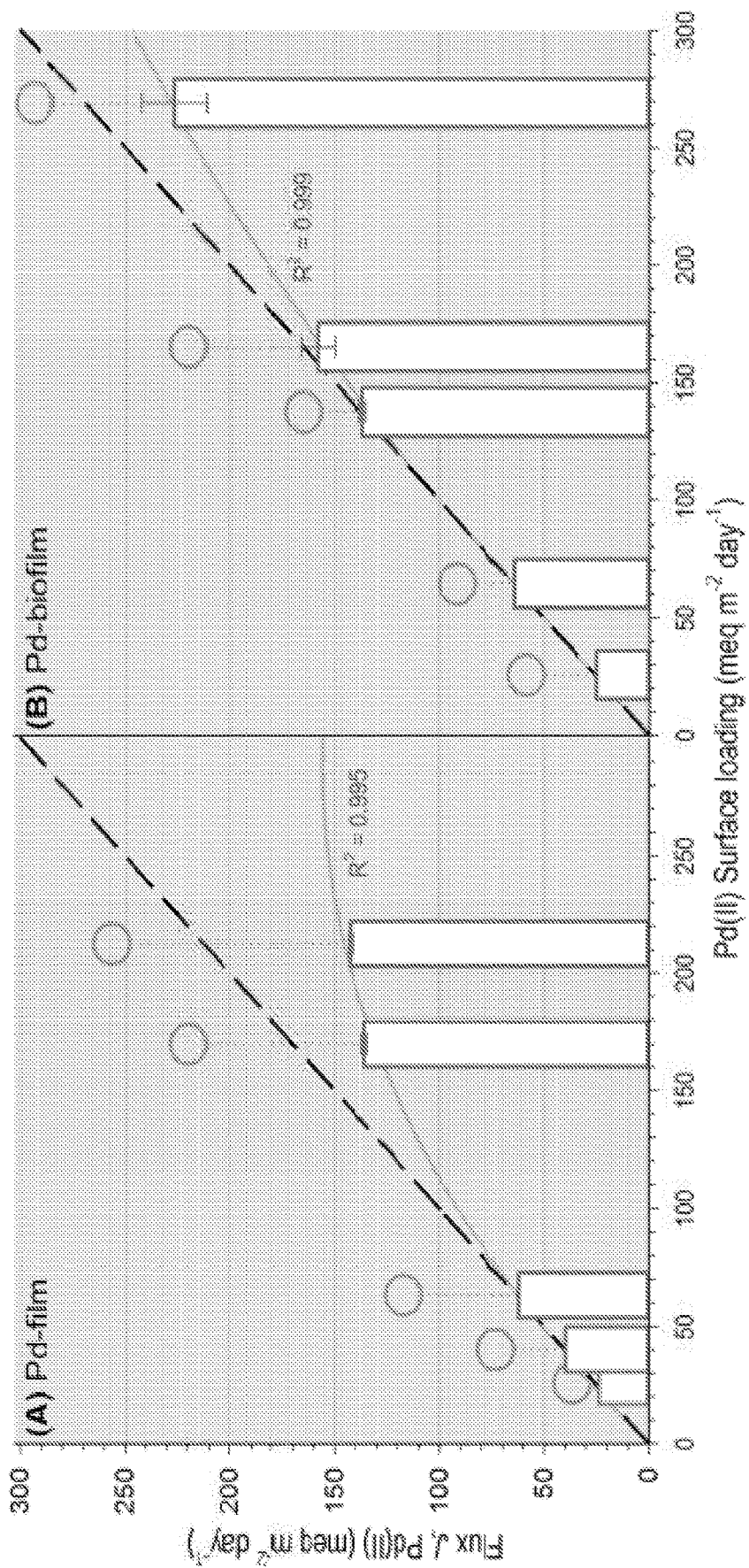
FIG. 4 show that average Pd(II) reduction fluxes (bars) at steady states of various Pd(II) surface loading in the abiotic PdM-A (left) system and the biotic PdM-B (right) system during the kinetic test. The dashed lines indicate the ideal condition of complete Pd(II) reduction (i.e. fluxes always equal to surface loading). The solid lines represent the simulated trends of the actual fluxes along with the surface loadings in both reactors. The circles show the calculated maximum H$_2$ fluxes at all steady states, and indicate that H$_2$ was not limiting throughout the test.

The biotic PdM-B showed higher recovery capacity than the abiotic PdM-A. When Pd surface loading was lower than 3.4 g/m$^2$-day due to the corresponding HRT larger than 8 hours (⅓ of the average HRT in Stage 1), the recovery capacities were similarly high (all >95%). As flow rate continued to increase, the capacity discrepancy became remarkable: PdM-B still recovered 80% Pd under the highest surface loading of 14.3 g/m$^2$-day (10 times of the initial loading) for SS5, while PdM-A only recovered 66% Pd under the highest loading of 11.3 g/m$^2$-day (8 times of the initial loading) for SS5. The simulated trends of the fluxes along with increasing surface loadings in FIG. 4 roughly extrapolate the maximum fluxes of 329 and 155 e− mEq/m$^2$-day in PdM-B and PdM-A, respectively.

Higher shear stress on membrane surface at increasing flow rate can cause detachment and leaching of solids. In PdM-B, Pd(0) leaching was negligible when the flow rate was below 0.22 mL/min, and then increased to 8.6 mg/L (0.06 g/m$^2$-day) under the highest flow rate of 0.45 mL/min at SS5. The high capacity of retaining deposited Pd(0) in PdM-B can be also attributed to the active binding groups in the biofilm.

The results described above indicate that an MBfR device and method can be applied to effectively recover Pd through reductive immobilization from the contaminated waste streams at either circumneutral or acidic pHs. The recovered metallic Pd(0) was maintained in nanometric sizes and retained in the biofilm at a HRT as low as 2.2 hours.

Example 3. Biofilm Stabilizes Pd(0) Nanoparticles/Nanoparticulates (Nano-Pd)

The quality of immobilized Pd in the two reactors varied. In the biotic PdM-B, nano-Pd associated with microbial cells mainly was mostly located on cell walls and/or in periplasmic spaces (cell examples #1-2), although occasionally occurred in the cytoplasm (#3). The size of Pd(0) varied from intercellular crystallites of several nanometers in diameter to >100 nm aggregates on cells directly attached to the fiber. In the outside layer of the biofilm, the predominant Pd(0) was poorer crystallites trapped and dispersed in EPS. They did not form agglomerates, but remained an average size of <10 nm. In the abiotic PdM-A, most of the nano-particulate Pd(0) agglomerated into μm-sized chunks.

Example 4. Biofilm Accelerated Denitrification

After Pd recovery, we started to feed both reactors with 14 mg $NO_3$—N/L at a constant flow rate of 0.08 mL/min (a HRT of 12 hours, giving a surface loading of 0.2 g $NO_3$—N/m$^2$/day) without batch period.

In PdM-B, nitrate reduction was triggered without lag and reached 50% within 1.5 days (3 HRTs), and achieved 90% within 10 days. At steady state, 100% nitrate was removed.

In contrast to PdM-B, PdM-A exhibited a distinctly slower denitrification pattern: nitrate removal was not observable during first 2 days and only 10% by Day 3, sluggishly climbed to 30% on Day 16, and was accelerated to 63% during the last four days. At steady state, only 79% nitrate was removed. The lower catalytic activity due to smaller Pd surface area and distant contact with diffusing H2, as well as absence of additional enzymatic process, determined the poorer denitrification efficiency in PdM-A.

Example 5. $H_2$ Pressure Determined $N_2$ Selectivity in Catalytic Denitrification We also observed conditional $NH_4^+$ accumulation in PdM-B due to the inherent divergence of Pd-based catalytic denitrification towards either $N_2$ or $NH_4^+$. From a perspective of drinking water treatment, $NH_4^+$ is definitely not a desired product due to its environmental concern. We tested the denitrification performance under various theoretical $H_2$ delivery capacities corresponding to different $H_2$ pressure. Table 3 below summarizes the results. In sum, as $H_2$ delivery capacity increased, the denitrification flux and the consequent nitrate removal increased. When $H_2$ delivery capacity was 91.5 e− meq/m$^2$/day, nitrate removal was 91.5% with no ammonium in the effluent, indicating a complete conversion towards $N_2$. When $H_2$ delivery capacity increased to 110 e-meq/m²/day, 97% nitrate was reduced, but 30% of them were converted to ammonium.

$N_2$ selectivity of Pd-catalytic denitrification was determined by $H_2$ delivery. Excess $H_2$ guaranteed almost complete nitrate removal, but it also stimulated further reduction towards $NH_4^+$. Thus, accurate $H_2$ delivery was particularly essential and challenging. In our system, controllable $H_2$ delivery on demand through its bubble-less diffusion via hollow-fiber membranes is a substantial benefit.

Figure 8:
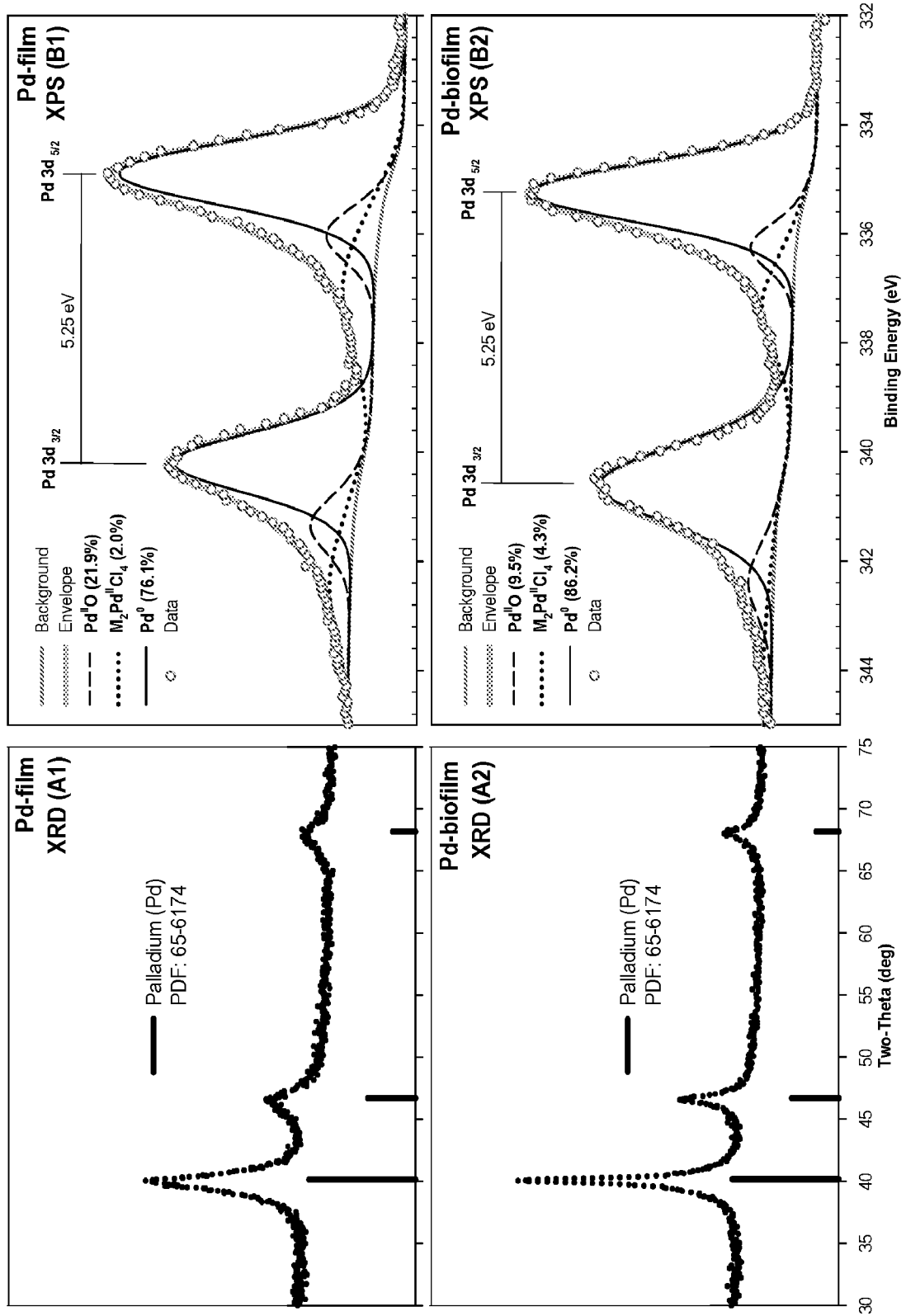
FIG. 8 depicts spectra of the powders collected from Pd-film and Pd-biofilm. % numbers in the parentheses in the legends stand for the atomic percentages of various Pd species in each sample. The A series of panels are XRD spectra, and the B series of panels are deconvoluted Pd 3d XPS spectra.

Example 6. Characterization of Biofilm, Pd-Film, and Pd-Biofilm a. PdNPs in Pd-Film and Pd-Biofilm FIG. 8 presents the XRD spectra and deconvoluted Pd 3d XPS spectra of the dried powder samples collected from the two Pd-loaded reactors. The major diffraction peaks at 40.0° (1 1 1), 46.5° (2 0 0), and 68.1° (2 2 0) in the XRD spectra confirm the similarly predominant presence of the Pd0 crystal structure with dominant facets of (1 1 1) in both reactors. Characteristic peaks of palladium oxide (PdO) were not observed either in the spectra of XRD (FIG. 8); this suggests negligible amounts of any Pd(II) forms retained in both reactors. However, XPS spectra reveal small portions of PdO (<22%, resulting from slight surface oxidation) and unreduced $PdCl_4^{2-}$ remnants (<5%) on PdNP surfaces. Particularly, the PdO content on the PdNP surfaces in Pd-biofilm (9.5%) was less than half of that in Pd-film (21.9%), probably due to the association with EPS that partially protected PdNPs from surface oxidation.

Figure 9:
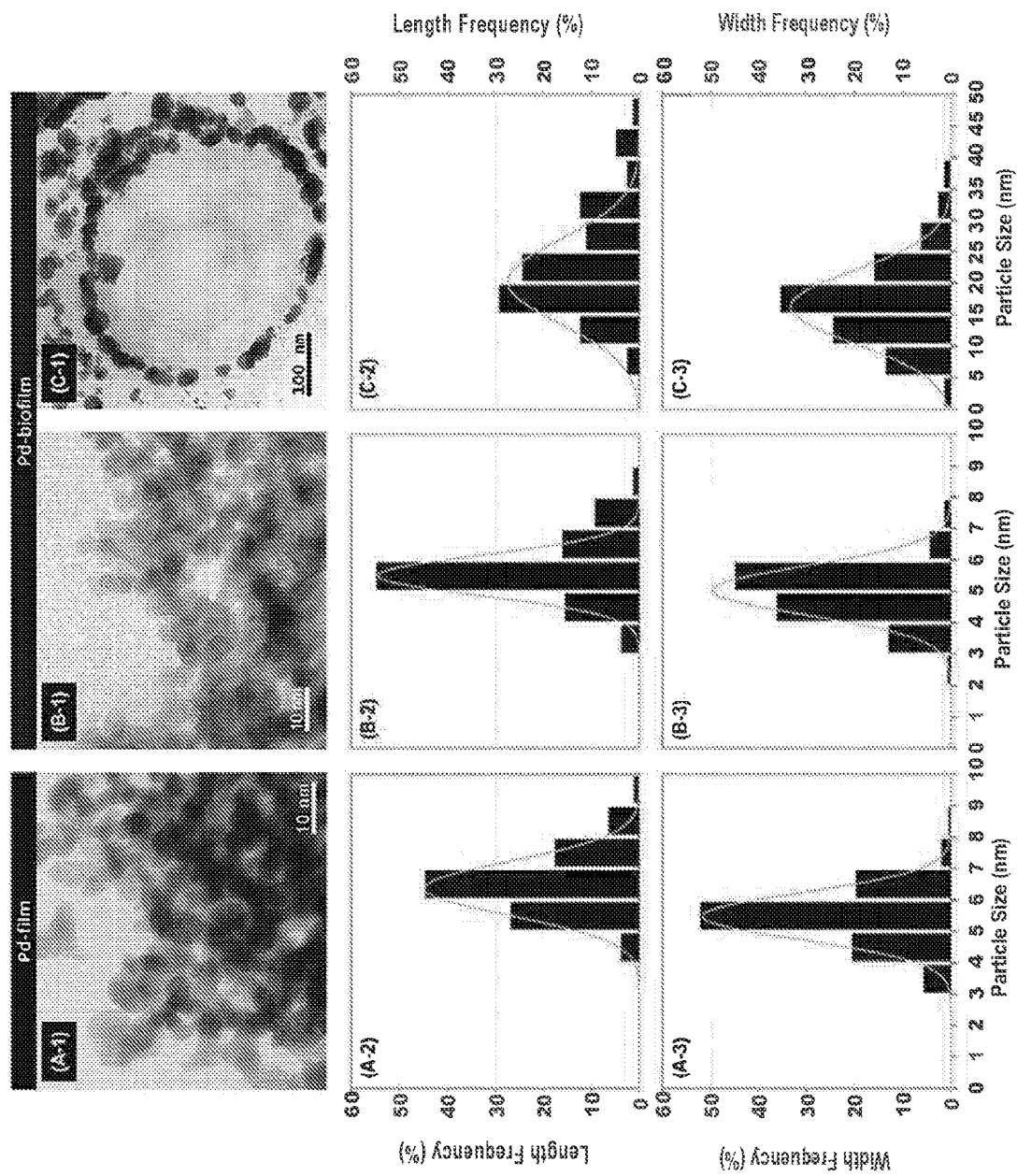
FIG. 9 depicts a representative STEM images (upper row) and size distribution histograms (middle and lower rows) of the PdNPs on the edge of the aggregated Pd-film (A series; 269 counts), associated with the EPS (B series; 536 counts) and deposited on the microbial cell surface (C series; 410 counts on the surfaces of 5 different cellular structures) of Pd-biofilm.

FIG. 9 presents microscopic images of the chemically fixed fiber samples collected from the three reactors. Despite the overall trend of aggregation in Pd-film, dispersed $Pd^0$ crystallites, with an average size of 6.5×5.4 nm, can be observed on the edge of the PdNP layers (FIG. 9, A series). In Pd-biofilm, while the PdNPs dispersed in the EPS matrix (FIG. 9, B series) exhibited slightly smaller crystallites of 5.6×4.9 nm, the PdNPs deposited on the cell surfaces grew into particles of average size 23×17 nm (FIG. 9, C series), probably through Ostwald ripening.

b. Microbial Communities in Biofilm and Pd-Biofilm

Figure 10:
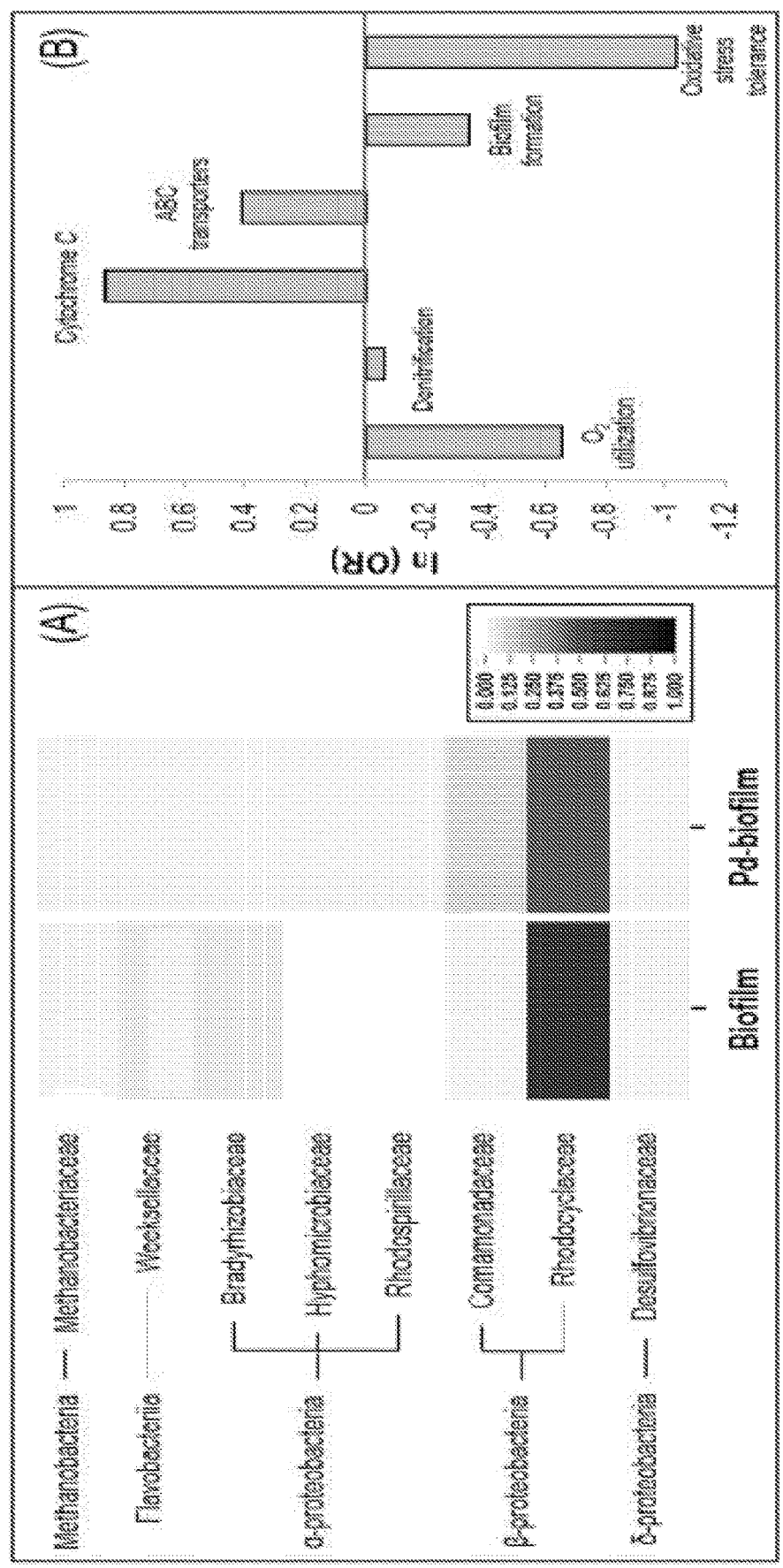
FIG. 10 shows the microbial community profiles of Biofilm and Pd-biofilm. Panel (A) depicts a heat map of phylogenetic structures at the family level. Unknown or <2% phylotypes in both samples are not shown. Panel (B) shows the odds ratios of selective 16s-rRNA-based predictive metagenomic functions in Pd-biofilm compared to those in Biofilm, as assigned by KEGG category database through PICRUSt and Bugbase analyses.

FIG. 10 presents phylogenetic relationships and predicted metagenomic functions of the microbial communities in Biofilm and Pd-biofilm. Both biofilms featured facultatively anaerobic β-proteobacteria with sequences clustering into the denitrifying Rhodocyclaceae family as the predominant active group (68% in Biofilm and 53% in Pd-biofilm; FIG. 10 Panel (A)). The total abundance of genes encoding enzymes involved in denitrification processes (listed in Table S2) were almost identical in Pd-biofilm and Biofilm (FIG. 10 Panel (B)). In contrast, genes encoding cytochrome c complexes and ATP-binding cassette (ABC) transporters were over-represented in Pd-biofilm (FIG. 10 Panel (B)); this implies that the bacteria in Pd-biofilm responded to metal stress (e.g., soluble-$Pd^{II}$ toxicity) by pumping out metals through ABC transporters and by enzymatic $Pd^{II}$ reduction through cytochrome c. In addition, $Pd^{II}$ reduction lowered the ORP from −235±12 mV in the denitrifying Biofilm to −311±37 mV in Pd-biofilm at steady state, and the more anaerobic conditions were reflected by a lower abundance of genes associated with $O_2$ utilization and oxidative stress tolerance (FIG. 10 Panel (B)).

In sum, all the characterization tools reveal that the denitrifying biofilm originally in Pd-biofilm adapted to the $Pd^{II}$-reducing condition while maintaining its capability of enzymatic denitrification. With or without biofilm, Pd was initially immobilized on the fiber surfaces as averagely 6×5 nm $Pd^0$ crystallites, but partial aggregation took place with Pd-film; the crystallites were stabilized in the EPS, but grew larger on the cell surfaces of Pd-biofilm.

c. Fastest Continuous Denitrification by Pd-Biofilm

Figure 11:
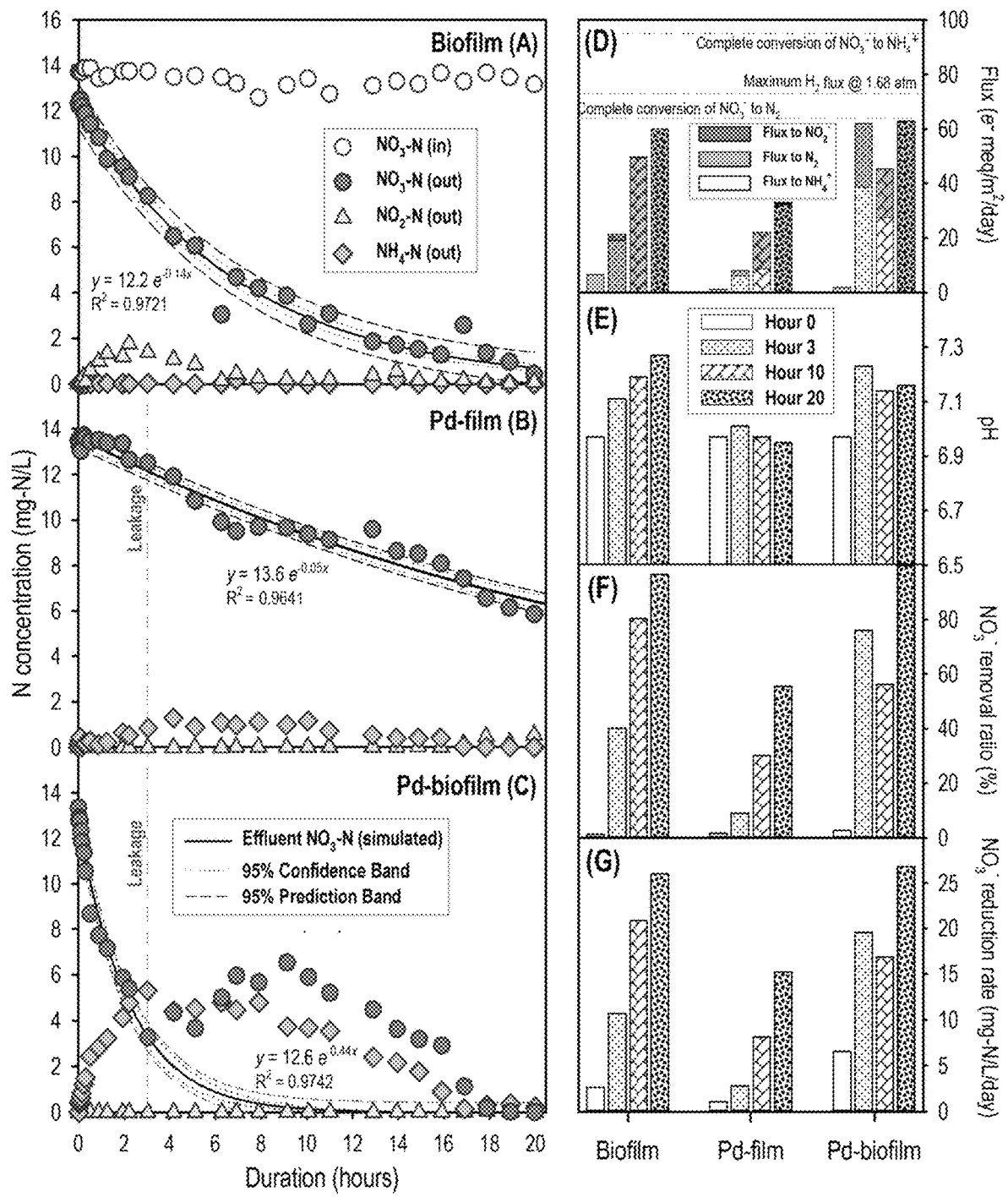
FIG. 11 shows the profiles of N species (NO$_3^-$, NO$_2^-$, and NH$_4^+$) and pH during the first 20 hours of the continuous denitrification tests in the three reactors. Panels A, B and C show the concentration profiles of NO$_3^-$—N, NO$_2^-$—N, and NH$_4^+$—N in Biofilm (Panel A), Pd-film (Panel B), and Pd-biofilm (Panel C) during the initial 20 hours. The vertical dashed line is the day of the accidental leakage in Pd-film and Pd-biofilm. Curved lines simulate the first-order decay trends of effluent NO$_3^-$—N concentrations throughout the test by fitting all the experimental data throughout the test in Biofilm and Pd-film and by fitting the experimental data during only the first three days (before leakage) in Pd-biofilm. Panels D-G show the transient N fluxes (Panel D), pH (Panel E), and NO$_3^-$ removal ratio (Panel F) and rate (Panel G) on at hours 0, 3, 10, and 20.

FIG. 11 presents the profiles of N species ($NO_3^-$, $NO_2^-$, and $NH_4^+$) and pH during the first 20 hours of the continuous denitrification tests in the three reactors. During the first three hours, $NO_3^-$ removal was 40%, 9%, and 76% in Biofilm (FIG. 11 Panel A), Pd-film (FIG. 11 Panel B), and Pd-biofilm (FIG. 11 Panel C), respectively. The simulated trend of effluent $NO_3^-$ based on the experimental data reveals that the effluent $NO_3^-$ concentrations followed $1^{st}$-order decay over the first three hours. The rate constant in Pd-biofilm (0.44 $d^{-1}$) was approximately 3-fold and 9-fold greater than the rates in Biofilm (0.15 $d^{-1}$) and Pd-film (0.05 $d^{-1}$), respectively.

After three hours, the influent tubing of Pd-film and Pd-biofilm broke, leading to leakage and 10 minutes of $O_2$ intrusion in the two reactors. The transient accident had no obvious impact on Pd-catalytic denitrification, as reflected by the consistent $1^{st}$-order decrease of the effluent nitrate concentration over time in Pd-film ($R^2$=0.9641; FIG. 11 Panel B); this was consistent with other research that observed that $O_2$ did not affect Pd-catalyzed nitrate reduction, but promoted selectivity to $N_2$. In contrast, Pd-biofilm lost 50% of its nitrate-removal rate over the next 6 hours, although the rate of nitrate removal then rose, reaching 99.9% removal efficiency by hour 20. The $1^{st}$-order trend before the leak predicts that, without the $O_2$ intrusion, $NO_3^-$ removal would have achieved 90% within 6 hours and 99.5% by 10 hours, substantially faster than Biofilm (80% removal by 10 hours and 90% by 16 hours). Thus, $O_2$ intrusion led to the partial loss of biological denitrification due to the disturbance to the microbial community, but the nitrate-reducing capacity attributed to the $O_2$-independent Pd catalysis (~56% removal, or nitrate reduction rate of 16.9 mg-N/L/day by 10 hours) was maintained. Once the $O_2$ disturbance was eliminated, Pd-biofilm exhibited self-recovery, as has been observed after disturbances in other biofilm systems.

d. Biofilm Accelerated $NO_3^-$ Reduction to $NO_2^-$, but not $NO_2^-$ Reduction The $NO_3^-$-removal performance in Pd-film (FIG. 11 Panel B) supports that, in contrast to previous short-term batch studies, the apparently monometallic Pd in Pd-film was able to reduce $NO_3^-$ to $NO_2^-$, though at a quite lower rate than with biofilm denitrification. This observation suggests that the Pd immobilized in the reactors were "contaminated" with some other catalytically reactive promoters, but at a significantly lower wt. % level than the other Pd—Cu or Pd—Ni catalysts. Possible sources for the metallic promotors incorporated into the Pd clusters could be the 0.06 mM copper and/or 0.04 mM nickel which, as trace nutrients in the medium, were continuously fed into Pd-film and Pd-biofilm along with Pd. However, even if all the Cu and Ni were incorporated with Pd, the Cu:Pd and Ni:Pd mole ratios were only 0.03 and 0.02, respectively; thus, they were not detected on XRD (FIG. 8).

In a supplementary test, the three reactors were fed with the same concentration (14 mg-N/L, or 1 mM) of $NO_2^-$. The rate of $NO_2^-$ decay in Pd-film was slightly slower than in Pd-biofilm, but considerably faster than in Biofilm. These trends suggest that $NO_2^-$ reduction was dominated by Pd catalysis, whether supported in the biofilm matrix or without biofilm; in addition, the partial aggregation of PdNPs in Pd-film and the crystallite growth of PdNPs on cell surfaces in Pd-biofilm did not contribute in great discrepancy of $NO_2^-$ reduction efficiencies. In addition, the $NO_2^-$-decay rate of Pd-film in the supplementary test was 15-fold higher than the $NO_3^-$-decay rate of the same reactor in the primary test (FIG. 11 Panel B); thus, the limiting factor for the slow $NO_3^-$ removal in Pd-film was the first step, and the biofilm had its biggest impact of accelerating $NO_3^-$ reduction to $NO_2^-$ in Pd-biofilm.

e. Higher Nitrate Removal Improved $N_2$ Selectivity

FIG. 11 shows that $NH_4^+$ transiently accumulated and then disappeared in both Pd-containing reactors. As shown in the phylogenetic profiling of the Pd-biofilm community in FIG. 10, the abundances of the δ- and γ-proteobacteria, capable of dissimilatory nitrate reduction to ammonium (DNRA), were negligible. These facts support that the formation of $NH_4^+$ in Pd-biofilm was mostly through Pd-catalytic nitrate reduction, as in Pd-film. In general, the potential for excess $H_2$ delivery promoted Pd-catalyzed production of $NH_4^+$. When slow $NO_3^-$ reduction was not able to scavenge all $H_2$, excess $H_2$ could be adsorbed to and stored in $Pd^0$, phenomena that are known to increase the chances of N—H pairing for $NH_4^+$ formation. As $NO_3^-$ reduction accelerated, the electrons from $H_2$ oxidation were diverted away from N—H pairing and towards N—N pairing and $N_2$ (e.g., 98% $N_2$ selectivity with 99.9% $NO_3^-$ removal and >90% $H_2$ utilization in Pd-biofilm by 20 hours). This mechanism led to the "tailing" profile of $NH_4^+$ concentration that occurred in parallel with increasing $NO_3^-$ removal in Pd-film and Pd-biofilm (FIG. 11 Panels B and C), a trend also observed in other continuous Pd-catalyzed denitrification processes.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

TABLE 1

Parameters for different influencing factors and average performance at steady state for acidic and circumneutral conditions.

| | | | | | | Steady State | | |
|---|---|---|---|---|---|---|---|---|
| | $PO_4$ | HRT[a] | Duration day | | | pH[c] | $Pd_{in}$[d] | $Pd_{out}$[e] | Pd recovery[f] |
| Condition | M | hr | Non-SS[b] | SS | Total | c.a. | mg/L | mg/L | % |
| Acidic | 1.5 | 24 (3)[g] | 10 | 8 | 18 | 4.5 (0.3) | 195 (5) | 1 (0) | 99.2 (0.5) |
| Circumneutral | 5.0 | 31 (0) | 11 | 6 | 17 | 6.9 (0.1) | 204 (14) | 1 (1) | 99.0 (0.8) |

[a] HRT refers to hydraulic retention time.
[b] SS refers to steady state.
[c] pH refers to the average pH value measured in the effluent at steady state, and it equals the value in the MBfR as the reactor was well mixed.
[d] $Pd_{in}$ refers to the average Pd concentration in the influent.
[e] $Pd_{out}$ refers to the average Pd concentration in the effluent, and it equals the value in the MBfR as the reactor was well mixed.
[f] The recovery is calculated as $(C_{Pd, in} - C_{Pd, eff})/C_{Pd, in}$, where $C_{Pd, in}$ is the Pd concentrations in influent, and $C_{Pd, eff}$ is the Pd concentration in effluent.
[g] Numbers in the parentheses in this column are the standard deviations of the average values by at least triplicate measurements at steady state

TABLE 2

The average performance parameters in the MBfR for five steady states during the kinetic test.

| Steady state | Flow rate $10^{-2}$ mL/min | | HRTa hr | | Pd surface loading[a] g/$m^2$-day | | Pd recovery[b] % | | Pd(0) leaching flux[c] g/$m^2$-day | |
|---|---|---|---|---|---|---|---|---|---|---|
| (SS) | PdM-B | PdM-A | PdM-B | PdM-A | PdM-B | PdM-A | PdM-B | PdM-A | PdM-B | PdM-A |
| SS1 | 3.1 | 3.9 | 30.8 | 25 | 1.4 | 1.4 | 98.0 | 99.0 | 0 | 0 |
| SS2 | 10.3 | 6.4 | 9.4 | 15.1 | 3.4 | 2.1 | 99.3 | 98.8 | 0 | 0.01 |
| SS3 | 22.4 | 12.2 | 4.3 | 7.9 | 7.3 | 3.4 | 96.2 | 95.2 | 0 | 0.02 |
| SS4 | 29.2 | 26.9 | 3.3 | 3.6 | 8.8 | 9.1 | 89.3 | 78.5 | 0.01 | 0.11 |
| SS5 | 44.7 | 35.3 | 2.2 | 2.7 | 14.3 | 11.3 | 80.0 | 65.8 | 0.06 | 0.19 |

[a] Pd Surface loading was calculated as $[Pd]_{in, total}·A/Q$, where $[Pd]_{in, total}$ is total concentration of Pd in influent, A is total membrane surface area, Q is flow rate.
[b] Pd reduction was calculated as $([Pd]_{in, total} - [Pd]_{eff, soluble})/[Pd]_{in, total}$.
[c] Pd(0) Leaching was calculated as $([Pd]_{eff, total} - [Pd]_{eff, soluble})·A/Q$, where $[Pd]_{eff, total}$ is total concentration of Pd in effluent.

TABLE 3

| H2 pressure | H$_2$ delivery flux | Dentrification Flux, total | | Dentrification Flux, to N$_2$ | | Dentrification Flux, to NO$_2$ | | Dentrification Flux, to NH$_4$ | | NO$_3$ removal | | Dentrification Selectivity to N$_2$ | |
|---|---|---|---|---|---|---|---|---|---|---|---|---|---|
| | | e- meq/m$^2$/day | | | | | | | | % | | | |
| psi | | average | stdev | average | stdev | average | stdev | average | stdev | average | stdev | average | stdev |
| 19.8 | 73.22 | 64.102 | 5.622 | 63.512 | 5.406 | 0.300 | 0.209 | 0.057 | 0.096 | 86.2% | 1.9% | 99.6% | 1.4% |
| 21.8 | 91.53 | 64.542 | 8.040 | 64.275 | 8.026 | 0.231 | 0.104 | 0.037 | 1.162 | 91.5% | 1.4% | 100.0% | 0.0% |
| 23.8 | 109.83 | 65.615 | 4.110 | 43.563 | 3.219 | 0.054 | 0.008 | 21.998 | 0.984 | 97.0% | 0.2% | 70.3% | 0.9% |

What is claimed:

1. A method of removing platinum-group metal contaminants from a fluid and harvesting a platinum-group metal from the platinum-group metal contaminants, the method comprising:
   contacting a fluid containing a platinum-group metal contaminant to a hydrogen gas and a biofilm anchored to a membrane, the biofilm anchored to the membrane comprising a hydrogen-oxidizing microorganism, an acidophilic microorganism, and a microorganism that reduces platinum-group metals;
   capturing the platinum-group metal contaminant in the biofilm; and
   harvesting the platinum-group metal contaminant from the biofilm.

2. The method of claim 1, the method further comprising:
   providing an aqueous system, wherein the aqueous system comprises the membrane and the membrane is a hollow fiber membrane;
   inoculating the hollow fiber membrane with sludge to establish a biofilm-forming population of microorganisms on the hollow fiber membrane, wherein the biofilm-forming population of microorganisms forms the biofilm anchored to the membrane;
   providing the inoculated aqueous system with a fluid comprising platinum-group metal contaminants, wherein the fluid comprising platinum-group metal contaminants establishes the biofilm and supports the growth of the biofilm.

3. The method of claim 2, wherein the aqueous system is an anaerobic aqueous system.

4. The method of claim 1, wherein the fluid comprising platinum-group metal contaminants comprises a nitrogen source selected from the group consisting of a nitrate salt (NO$_3^-$) and a nitrite salt (NO$_2$).

5. The method of claim 1, the method further comprising:
   providing the inoculated aqueous system with a denitrifying medium until the biofilm-forming population of microorganisms forms the biofilm, wherein the denitrifying medium comprises a nitrogen source selected from the group consisting of a nitrate salt (NO$_3^-$) and a nitrite salt (NO$_2^-$).

6. The method of claim 1, wherein the biofilm comprises a genus of microorganism that is hydrogen-oxidizing, acidophilic, and reduces platinum-group metals.

7. The method of claim 1, wherein the reduced platinum-group metal contaminant is in the form of a nanoparticle.

8. The method of claim 1, wherein the platinum-group metal contaminant is palladium (II) (Pd(II)), the biofilm comprises a microorganism that reduces Pd (II), and the reduced platinum-group metal contaminant is solid palladium (0) (Pd(0)).

9. The method of claim 1, wherein the fluid comprising platinum-group metal contaminants has a pH range selected from the ranges in the group consisting of: 3-8, less than 7, and 3-5.

10. The method of claim 1, wherein the biofilm comprises at least one microorganism population selected from the group consisting of: Methanobacteriales, Actinomycetales, Clostridiales, Bacteroidales, Flavobacteriales, Rhizobiales, Rhodospirillales, Burkholderiales, Rhodocyclales, Xanthomonadales, and Desulfovibrionales.

11. The method of claim 1, wherein the biofilm comprises at least one microorganism population selected from the group consisting of: Rhodocyclaceae, Rhizobiales, Burkholderiales, Methanobacteriaceae, Mycobacteriaceae, Comamonadaceae, Bradyrhizobiaceae, Desulfovibrionaceae, and Xanthomonadaceae.

12. The method of claim 1, wherein the biofilm comprises at least one microorganism population selected from the group consisting of: *Dechloromonas, Desulfovibrio*, and Actinobacteria.

13. The method of claim 1, wherein the biofilm comprises at least one group of microorganism selected from the group consisting of consisting of: methanobacteria, flavobacteria, α-proteobacteria, β-proteobacteria, and δ-proteobacteria.

14. The method of claim 1, wherein the reduced platinum-group metal contaminant is in a solid state.

15. A system for removing and harvesting platinum-group metal contaminants from a fluid, the system comprising:
   a membrane;
   an inoculant comprising a biofilm-forming population of microorganisms comprising a hydrogen oxidizer, an acidophile, and a microorganism that reduces platinum-group metals; and
   a hydrogen-gas source.

16. The system of claim 15, wherein the inoculant comprises at least one group of microorganism selected from the group consisting of: methanobacteria, flavobacteria, α-proteobacteria, β-proteobacteria, and δ-proteobacteria.

17. The system of claim 15, wherein the fluid comprises a platinum-group metal contaminant and a biofilm comprising the biofilm-forming population of microorganisms utilizes hydrogen gas to reduce the platinum-group metal contaminant, thereby capturing reduced platinum-group metal in the biofilm.

18. The system of claim 15, wherein the membrane is a nonporous hollow fiber membrane.

19. The system of claim 15, further comprising a growth medium, the growth medium comprising at least one of a nitrogen source and a nutrient, wherein the nitrogen source is selected from the group consisting of a nitrate salt (NO$_3^-$), and a nitrite salt (NO$_2^-$), wherein the nutrient comprises at least one selected from the group consisting of: NH$_4$C$_1$, K$_2$HPO$_4$, CaCl$_2$, MgCl$_2$, FeCl$_2$, MgSO$_4$, ZnSO$_4$, MnCl$_2$, H$_3$BO$_3$, CoCl$_2$, CuCl$_2$, NiCl$_2$, Na$_2$MoO$_4$, and Na$_2$SeO$_3$.

20. The system of claim 15, wherein the biofilm-forming population of microorganisms forms a biofilm, wherein the biofilm is anchored to the membrane.

* * * * *